US011533270B2

(12) United States Patent
Labonté

(10) Patent No.: US 11,533,270 B2
(45) Date of Patent: Dec. 20, 2022

(54) ADAPTIVE BUFFERING IN A DISTRIBUTED SYSTEM WITH LATENCY / ADAPTIVE TAIL DROP

(71) Applicant: Arista Networks, Inc., Santa Clara, CA (US)

(72) Inventor: François Labonté, Menlo Park, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 17/078,957

(22) Filed: Oct. 23, 2020

(65) Prior Publication Data

US 2022/0131811 A1 Apr. 28, 2022

(51) Int. Cl.
*H04L 47/62* (2022.01)
*H04L 43/0852* (2022.01)
*H04L 43/0888* (2022.01)
*H04L 47/2466* (2022.01)
*H04L 47/283* (2022.01)
*H04L 47/32* (2022.01)
*H04L 47/6275* (2022.01)

(52) U.S. Cl.
CPC ...... *H04L 47/6215* (2013.01); *H04L 43/0852* (2013.01); *H04L 43/0888* (2013.01); *H04L 47/2466* (2013.01); *H04L 47/283* (2013.01); *H04L 47/32* (2013.01); *H04L 47/6275* (2013.01)

(58) Field of Classification Search
None
See application file for complete search history.

(56) References Cited

U.S. PATENT DOCUMENTS

| 8,797,877 | B1 * | 8/2014 | Perla | H04L 49/90 |
| | | | | 370/235 |
| 9,674,104 | B1 | 6/2017 | Pan et al. | |
| 10,547,561 | B1 | 1/2020 | Patel et al. | |
| 2013/0329577 | A1 | 12/2013 | Suzuki et al. | |
| 2016/0036731 | A1 * | 2/2016 | Srinivasan | H04L 49/9015 |
| | | | | 370/417 |
| 2017/0318071 | A1 * | 11/2017 | Kinsbergen | H04L 1/1835 |

OTHER PUBLICATIONS

International Searching Authority, International Search Report and Written Opinion for corresponding PCT Application No. PCT/US2021/056160 filed Oct. 22, 2021, 16 pages.

* cited by examiner

*Primary Examiner* — Jason E Mattis
*Assistant Examiner* — Bao G Nguyen
(74) *Attorney, Agent, or Firm* — Sprinkle IP Law Group

(57) ABSTRACT

A network device includes a switching system for directing packets between ingress ports and egress ports of the network device. The network device also includes a switching system manager that makes an identification of a state change of a virtual output queue of the switching system; and performs an action set, based on the state change, to modify a latency of the virtual output queue to meet a predetermined latency in response to the identification.

20 Claims, 15 Drawing Sheets

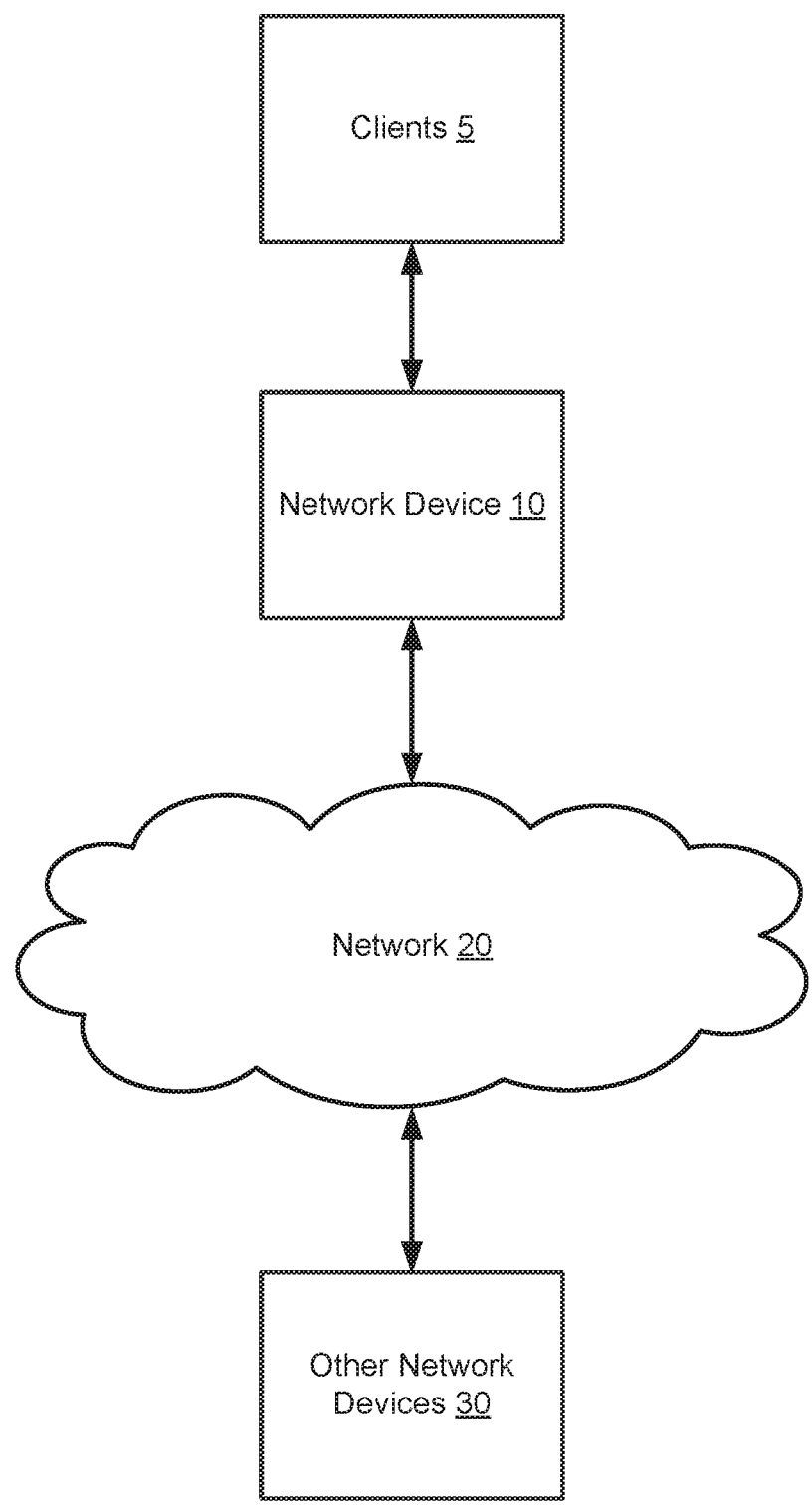
FIG. 1.1

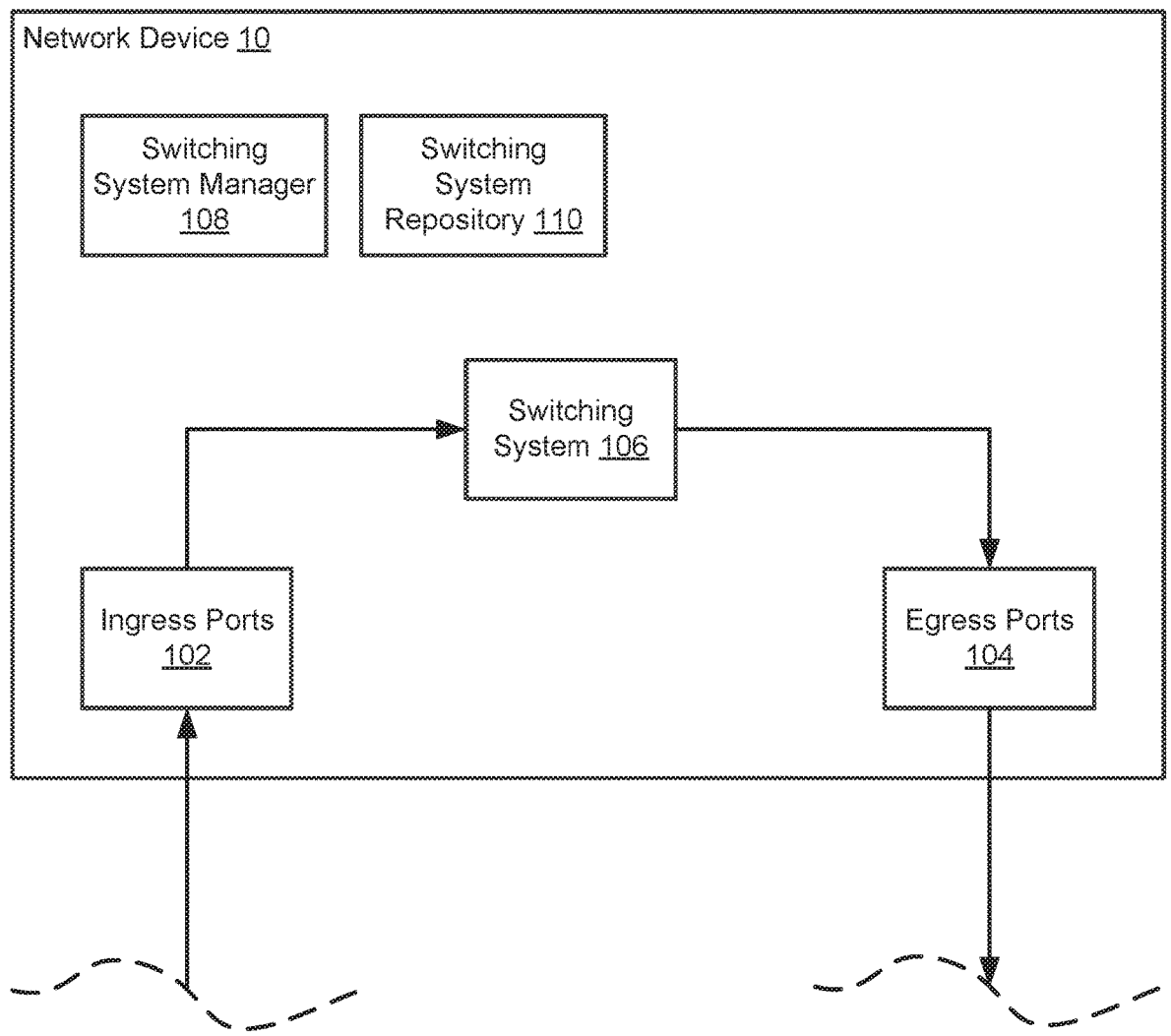
FIG. 1.2

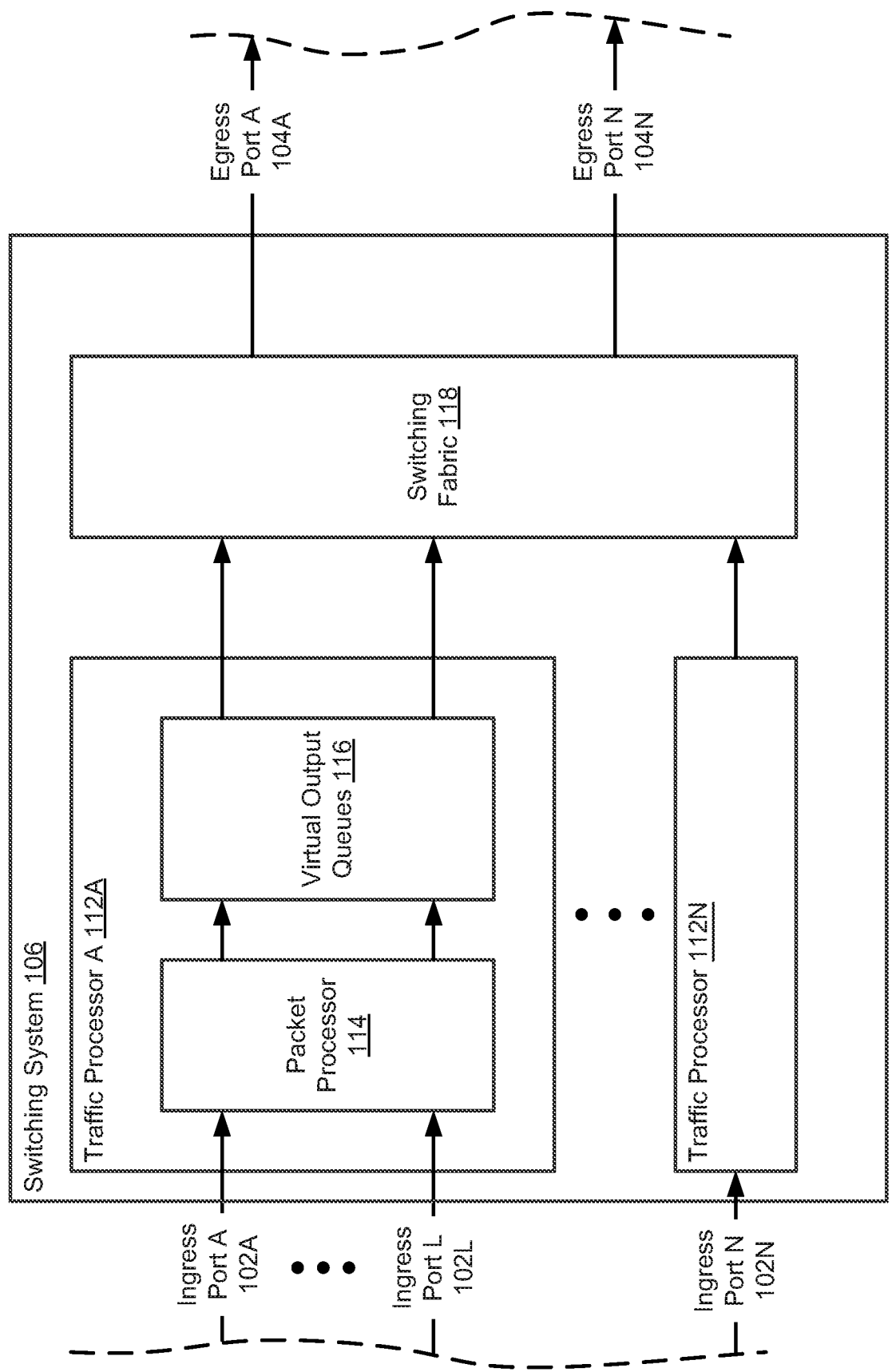
FIG. 1.3

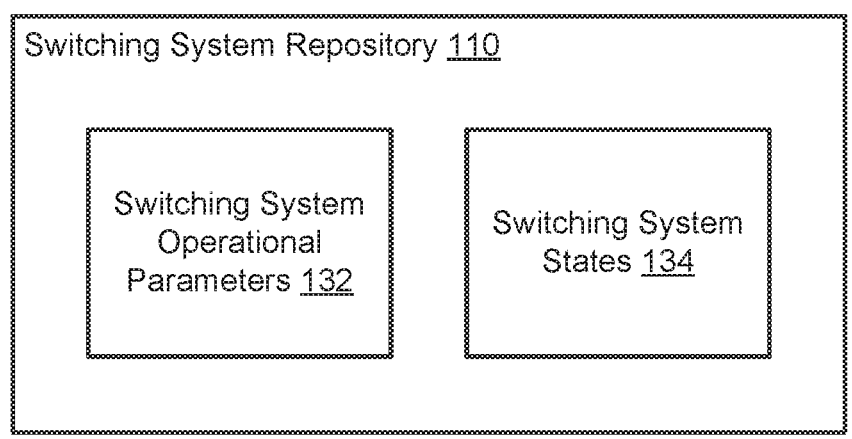
FIG. 1.4

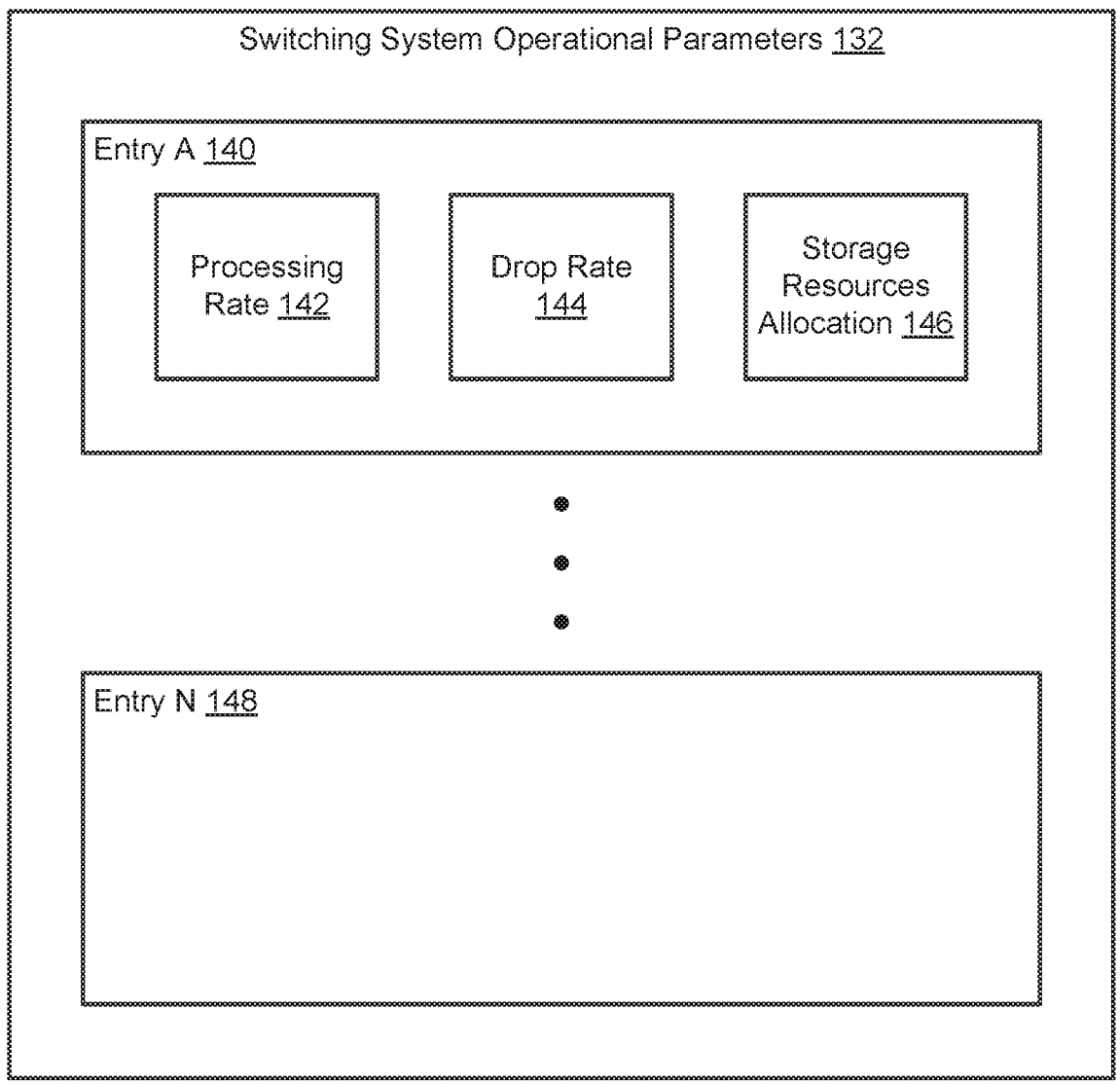
FIG. 1.5

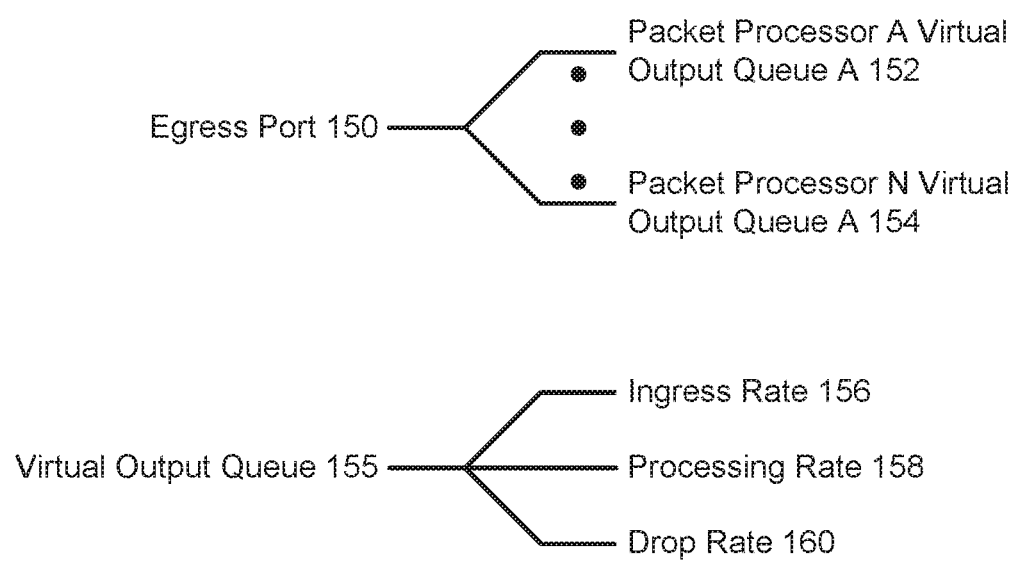
FIG. 1.6

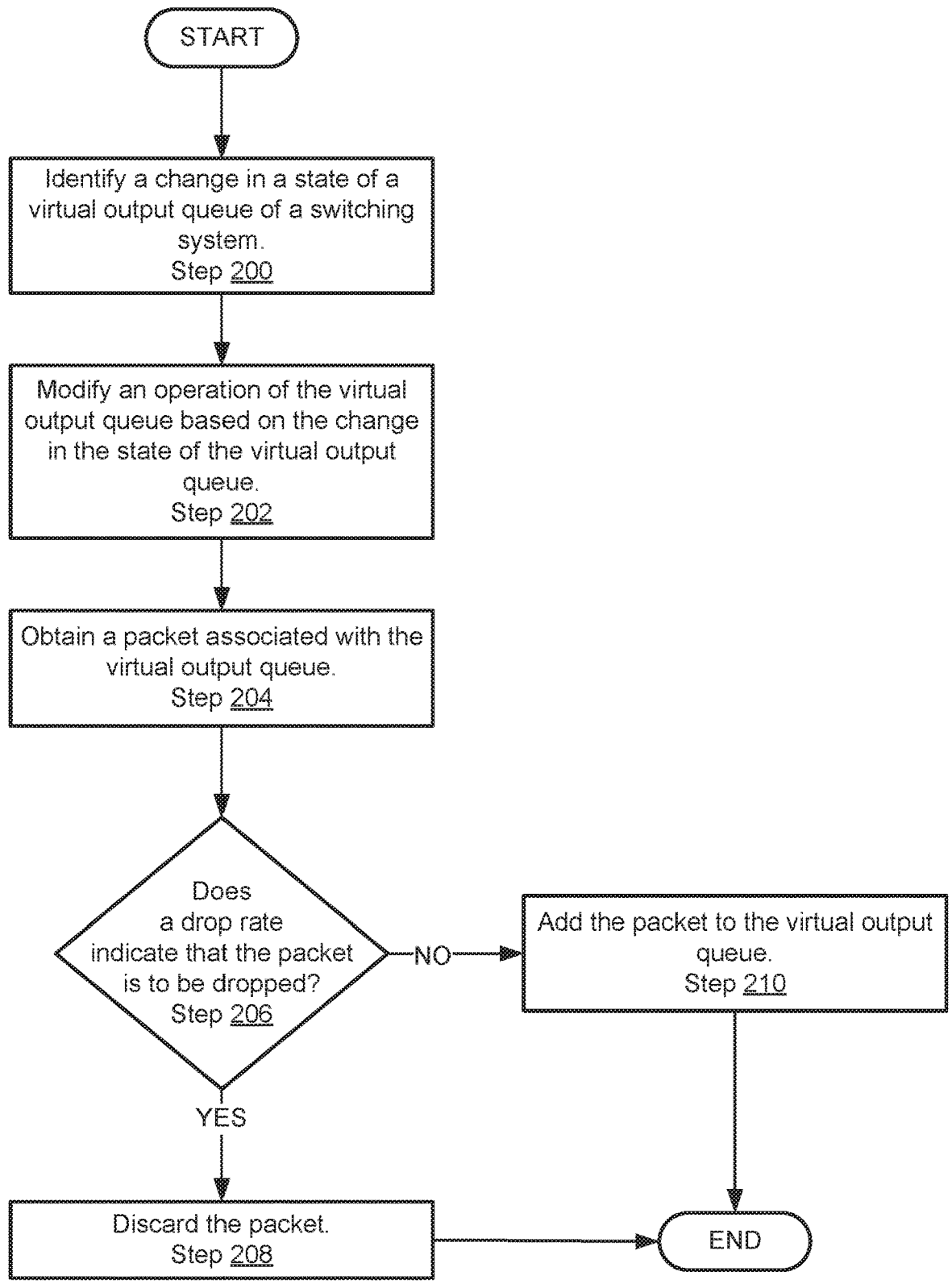
FIG. 2.1

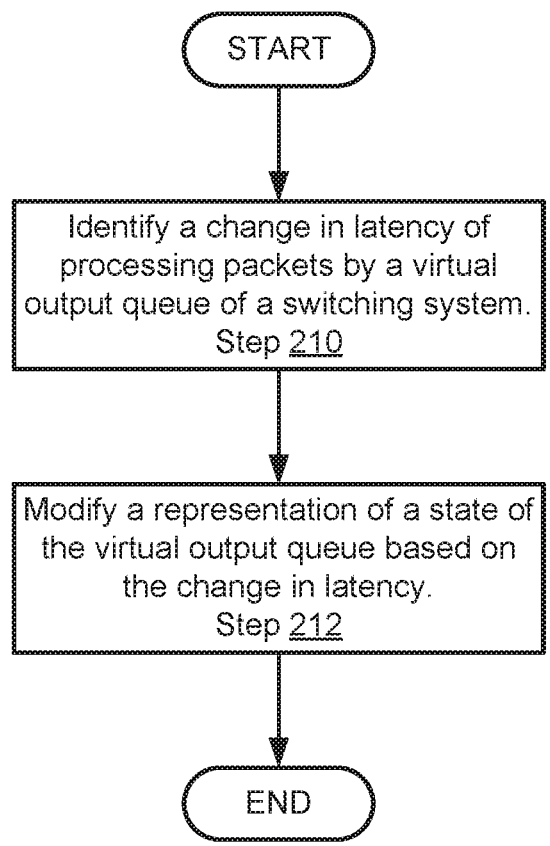
FIG. 2.2

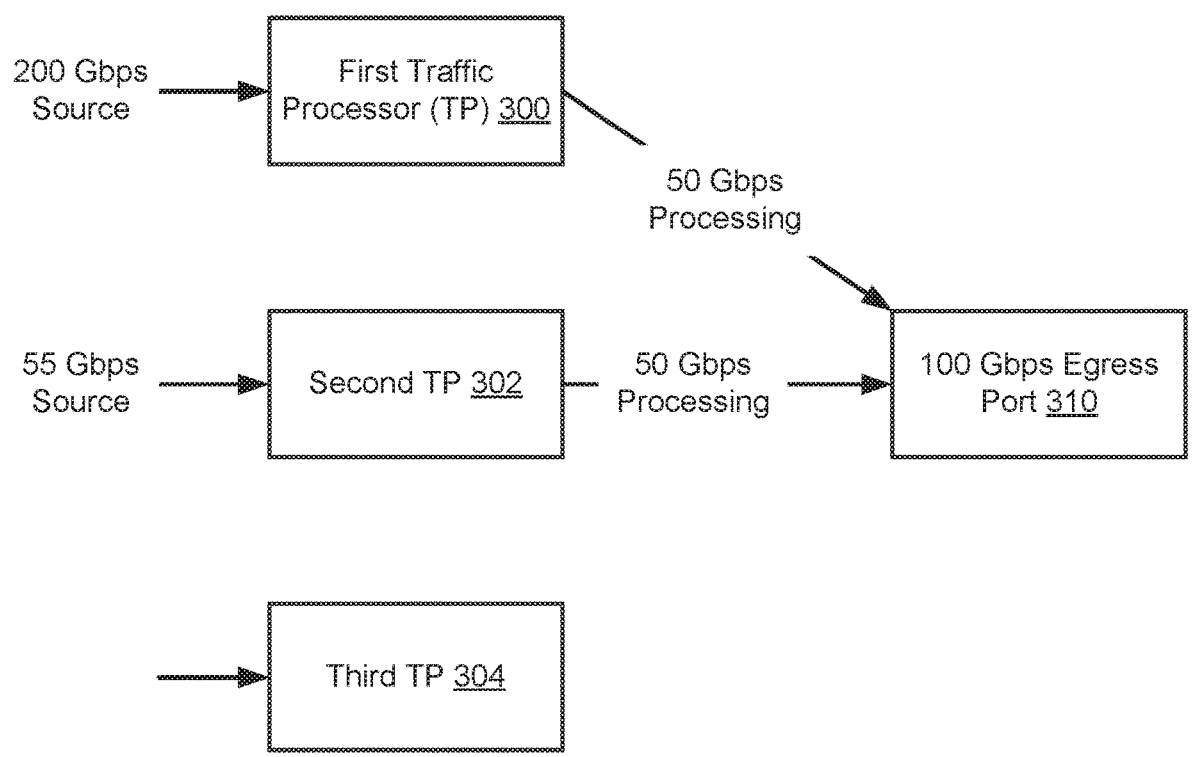
FIG. 3.1

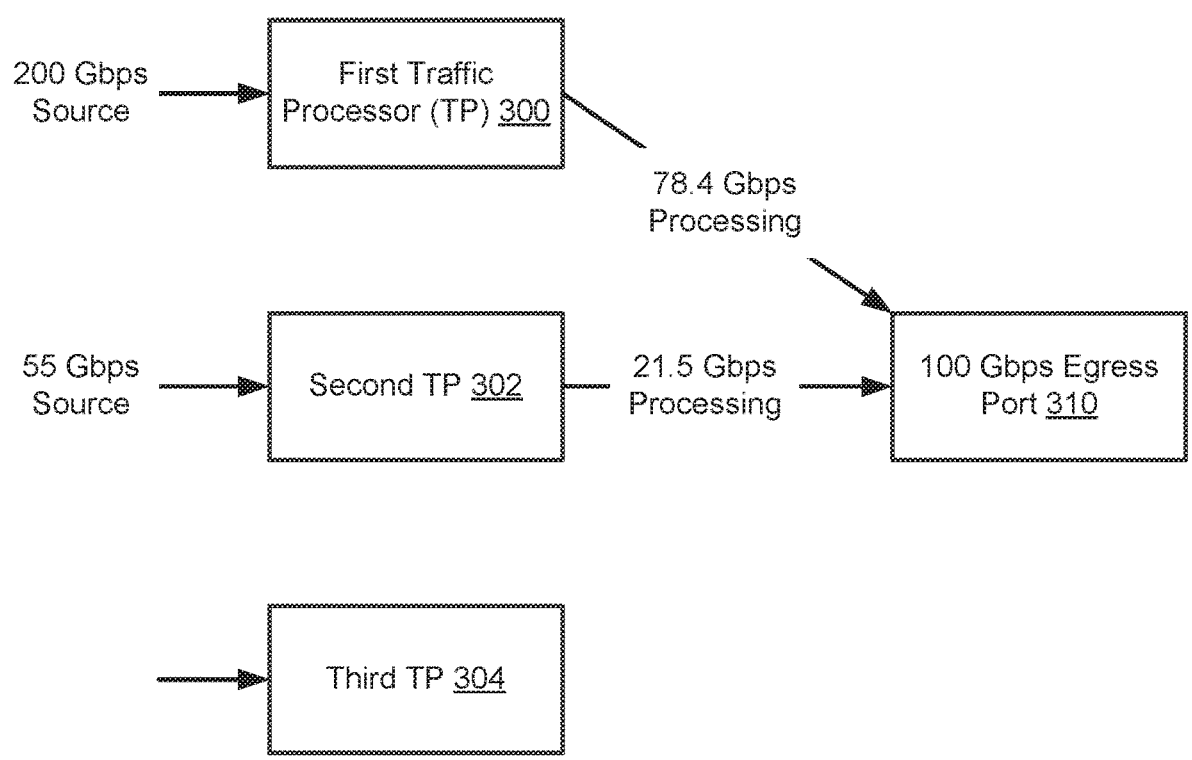
FIG. 3.2

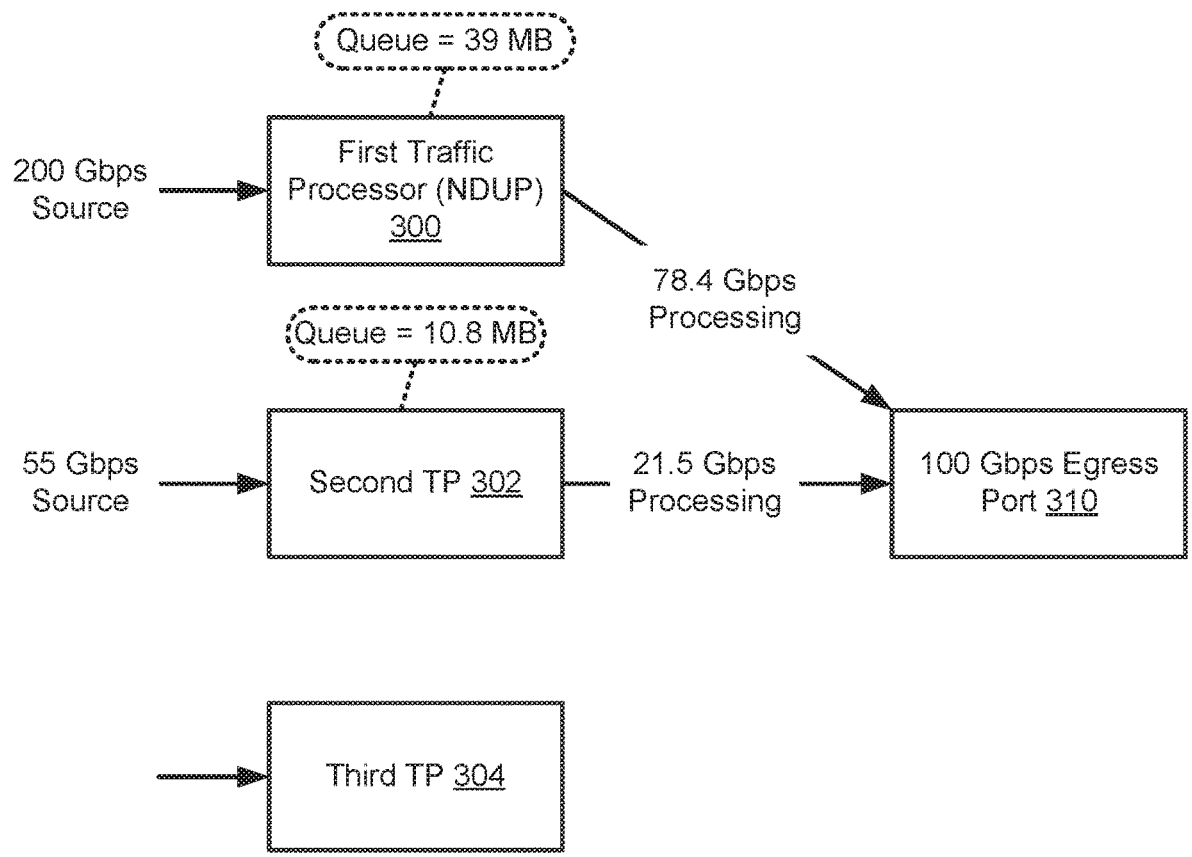
FIG. 3.3

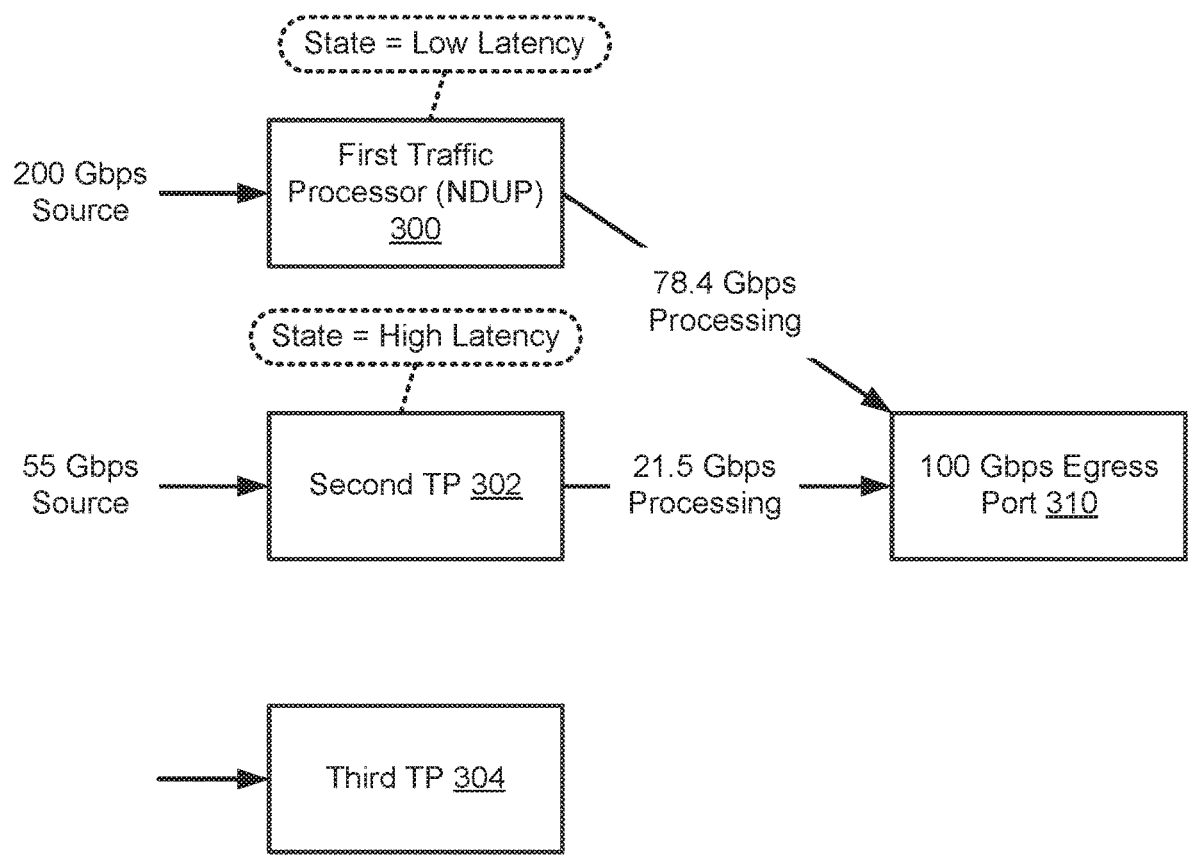
FIG. 3.4

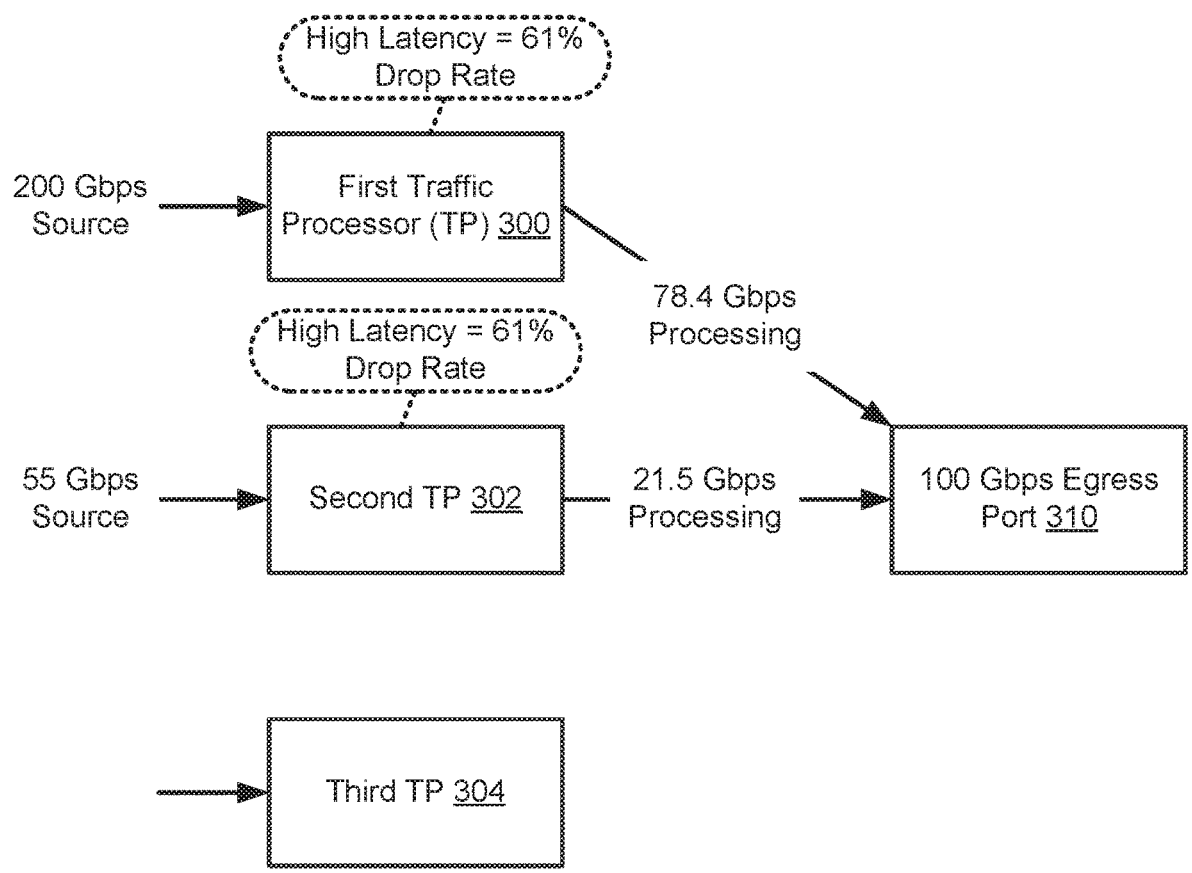
FIG. 3.5

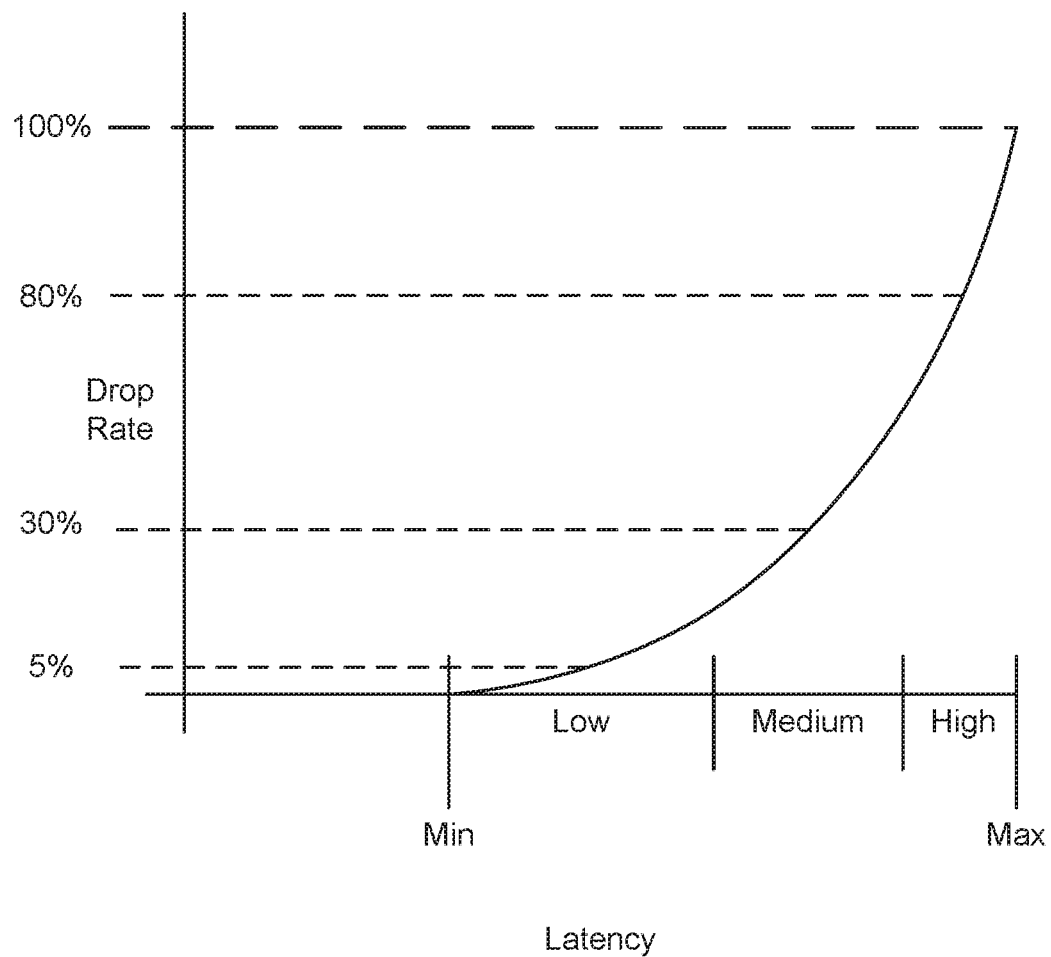
FIG. 3.6

ADAPTIVE BUFFERING IN A DISTRIBUTED SYSTEM WITH LATENCY / ADAPTIVE TAIL DROP

BACKGROUND

Computing devices may utilize computing resources to perform their functionality. For example, computing devices may utilize processing resources to execute instructions, memory resources to temporarily store data, storage resources to store data long term, etc. The quantity of each of these resources may be limited.

SUMMARY

In one aspect, a network device in accordance with embodiments disclosed herein includes a switching system for directing packets between ingress ports and egress ports of the network device; and a switching system manager that makes an identification of a state change of a virtual output queue of the switching system; and performs an action set, based on the state change, to modify a latency of the virtual output queue to meet a predetermined latency in response to the identification.

In one aspect, a method in accordance with one or more embodiments disclosed herein includes making an identification of a state change of a virtual output queue of a switching system for directing packets between ingress ports and egress ports of a network device; performing an action set, based on the state change, to modify a latency of the virtual output queue to meet a predetermined latency in response to the identification.

In one aspect, a non-transitory computer readable medium in accordance with one or more embodiments disclosed herein includes computer readable program code, which when executed by a computer processor enables the computer processor to perform a method, the method includes making an identification of a state change of a virtual output queue of a switching system for directing packets between ingress ports and egress ports of a network device; performing an action set, based on the state change, to modify a latency of the virtual output queue to meet a predetermined latency in response to the identification.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

FIG. 1.1 shows a diagram of a system in accordance with one or more embodiments disclosed herein.

FIG. 1.2 shows a diagram of a network device in accordance with one or more embodiments disclosed herein.

FIG. 1.3 shows a diagram of a switching system in accordance with one or more embodiments disclosed herein.

FIG. 1.4 shows a diagram of a switching system repository in accordance with one or more embodiments disclosed herein.

FIG. 1.5 shows a diagram of switching system operational parameters in accordance with one or more embodiments disclosed herein.

FIG. 1.6 shows a relationship diagram of relationships in accordance with one or more embodiments disclosed herein.

FIG. 2.1 shows a flowchart of managing a switching system in accordance with one or more embodiments disclosed herein.

FIG. 2.2 shows a flowchart of method of managing latency states in accordance with one or more embodiments disclosed herein.

FIGS. 3.1-3.6 show a non-limiting example of a system at different points in time and/or relationships used by the system in accordance with embodiments disclosed herein.

DETAILED DESCRIPTION

Figure 4:
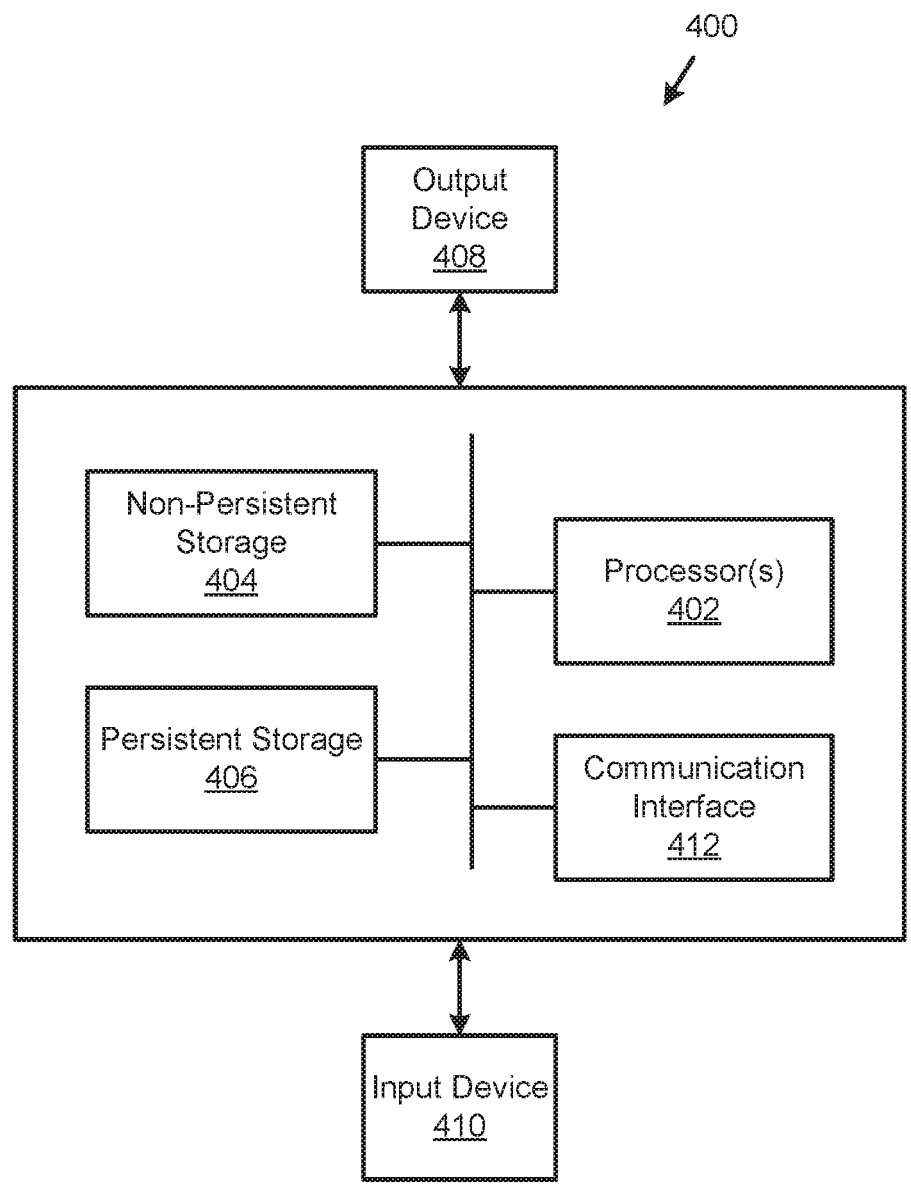
FIG. 4 shows a diagram of a computing device in accordance with one or more embodiments disclosed herein.

Networks may include devices that generate, send, receive, and/or forward packets. A packet may be forwarded by obtaining the packet on an ingress port, switching the packet to an egress port, and providing the packet to another device via the egress port.

A network device that forwards packets may have a limited ability to forward packets based on the architecture it uses to switch the packets. For example, the network device may only be able to forward a predetermined number of packets per using each of their egress ports (e.g., 100 Gigabits per second) per unit time. In another example, the network device may only be able to buffer a limited number of packets.

Additionally, the network device's architecture for forwarding packets may be configurable. For example, the network device may include a finite amount of resources usable for buffering that may be allocated across a number of ports. The forwarding behavior of the network device may be undesirable if the resources usable for buffering are allocated, for example, proportionally across all of the ports based on the respective rates at which packets enter each of the ports. Allocating the resources in this manner may have undesirable consequences for network wide routing such as increased latency of packets. The increased latency of the packets may result in other components of the network (i) resending copies of the packets and/or (ii) discarding the packets after the packets are buffered.

One or more embodiments disclosed herein provide methods and systems for managing the latency of packets that are buffered during forwarding of the packets. To do so, a system in accordance with embodiments disclosed herein may monitor the latency states of virtual output queues used to buffer packets during forwarding. The system may allocate resources (e.g., reduce or increase the number of packets that may be buffered in each of the virtual output queues) to the virtual output queues based on the latency states of the virtual output queues to reduce the likelihood that packets are buffered for greater than a predetermined amount of time. In other words, to meet latency goals for packets during forwarding.

The system may also proactively drop packets that would otherwise be buffered, based on the latency states of the virtual output queues. Doing so may reduce the likelihood that packets are buffered for greater than a predetermined amount of time (e.g., a latency goal). Packets may be proactively dropped even when the virtual output queues have sufficient capacity (e.g., storage resources) to buffer additional packets.

By proactively dropping packets based on the latency states of the virtual output queues, embodiments disclosed herein may (i) avoid deleterious downstream impacts on packet routing, (ii) indirectly signal to upstream entities (by virtue of dropped packets) that the network device is unable to forward the current volume of packets which it is obtaining for forwarding purposes, and/or (iii) avoid consumption of virtual output queue storage space for packets that will be discarded downstream due to the latency of the packets caused by buffering in the virtual output queue.

Thus, embodiments disclosed herein may provide a network device that more efficiently marshals (i) its own limited resources by avoiding buffering that does not positively contribute to packet routing and/or (ii) resources of other devices by proactively dropping packets that will likely become high latency packets after buffering. Consequently, downstream devices may be prevented from using their resources for processing the high latency packets that will likely be discarded.

In the text that follows, a description of components of a system in accordance with embodiments disclosed herein is provided with respect to FIGS. 1.1-1.3. A description of data structures that may be used by the system of FIG. 1.1 is provided with respect to FIGS. 1.4-1.5. After the description of the data structures, a description of relationships that may be present in the system of FIG. 1.1 is provided with respect to FIG. 1.6.

Following the description of the relationships, a description of methods that may be performed by components of the system of FIG. 1.1 is provided with respect to FIGS. 2.1-2.2. An example of a series of actions that may be performed by the system of FIG. 1.1 is provided with respect to FIGS. 3.1-3.6. Lastly, a description of a computing device that may be used to implement the system of FIG. 1.1 is provided with respect to FIG. 4.

Specific embodiments will now be described with reference to the accompanying figures. In the following description, numerous details are set forth as examples. It will be understood by those skilled in the art, and having the benefit of this document, that one or more embodiments described herein may be practiced without these specific details and that numerous variations or modifications may be possible without departing from the scope of the embodiments. Certain details known to those of ordinary skill in the art may be omitted to avoid obscuring the description.

In the following description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, operably connected, or operative connection, means that there exists between elements/components/devices a direct or indirect connection that allows the elements to interact with one another in some way. For example, the phrase 'operably connected' may refer to any direct (e.g., wired directly between two devices or components) or indirect (e.g., wired and/or wireless connections between any number of devices or components connecting the operatively connected devices) connection. Thus, any path through which information may travel may be considered an operable connection.

FIG. 1.1 shows a diagram of an example system in accordance with one or more embodiments described herein. The system may include clients (5) that utilize services provided by network device (10). The services provided by the network device (10) may include, for example, packet forwarding services. By forwarding packets, network device (10) may enable clients (5) to communicate with other devices (e.g., other clients, network (20), or other network devices (30)).

For example, network device (10) may be operably connected to other network devices (30) via network (20). Network device (10), network (20), and other network devices (30) may cooperate (e.g., all implement one or more common network communication protocols) to forward packets to each other. Network device (10) may also forward packets to clients (5). The packets may include messages destined for the various devices of the example system.

Forwarding packets may consume computing resources of the devices of FIG. 1.1. For example, when a packet is sent from clients (5) to network device (10), network device (10) may need to perform one or more actions to determine to which device (e.g., a device of network (20) or another device not illustrated in FIG. 1.1) to forward the packet. To forward a packet, network device (10) may receive the packet on an ingress port and send the packet out of an egress port that directs the packet towards a destination. Network device (10) may include multiple ingress ports and egress ports. Consequently, network device (10) may need to selectively direct (e.g., switch) packets towards corresponding egress ports to direct the packets towards corresponding destinations.

Additionally, any of the aforementioned ports may be bi-directional and may dynamically change between being ingress and an egress port at any time. Thus, any port may perform the functions of an ingress port, egress port, or both at any point in time.

While each of the devices of FIG. 1.1 are illustrated as being operably connected to other devices using lines having double ended arrows as ends, such lines may represent any number of physical connections over which the packets may be forwarded. For example, the line between network device (10) and network (20) may represent ten physical connections between network device (10) and devices of network (20). In such a scenario, packets received by network device (10) may be forwarded towards network (20) and/or other network devices (30) using any of the ten physical connections.

In another example, the line between network device (10) and network (20) may represent a connection between network device (10) and another device (not shown) which is, in turn, physically connected to a device of network (20). In such a scenario, packets received by network device (10) may be forwarded towards network (20) and/or other network devices (30) using the connection to the other device (not shown) and the connection between the other device and the device of network (20).

Each of the aforementioned physical connections between network device (10) and other devices may have limited bandwidths. In other words, only a finite quantity of packets per unit time (e.g., packet traffic) may be transmitted between network device (10) and other devices via each of the physical connections interconnecting the aforementioned devices. Consequently, if the number of packets received by network device (10) and that need to be sent via a particular physical connection towards another device exceeds the finite number of data units per unit time that may be transmitted via the particular physical connection, network device (10) may need to buffer some of the packets for sending in the future.

However, buffering packets may incur latency (e.g., delay time). If the latency exceeds predetermined amounts, the latency may have a negative impact on the ability of the system to forward packets. For example, communication protocols may cause packets having latencies that exceed a threshold to be dropped. In such a scenario, additional packets (e.g., replacement packets) may need to be forwarded throughout the system to replace the dropped packets.

Embodiments disclosed herein may provide a network device (e.g., 10) that manages the manner in which packets are processed for forwarding purposes to provide a predetermined quality of forwarding service. The predetermined quality of forwarding service may limit the maximum amount of time that the packets are buffered. In other words, the maximum amount of latency during buffering for packet forwarding purposes may be limited to a predetermined amount of time. For additional details regarding limiting the latency for buffering by network device (10) for forwarding purposes, refer to FIG. 1.2.

Any of the components of FIG. 1.1 may be operably connected by any combination and/or number of wired and/or wireless connections.

As discussed above, the system of FIG. 1.1 may include network devices that may provide packet forwarding services. Any of the devices of FIG. 1.1 may be implemented using computing devices. The computing devices may be, for example, mobile phones, tablet computers, laptop computers, desktop computers, servers, switches, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 2.1-2.2. The devices of FIG. 1.1 may be implemented using other types of computing devices without departing from the embodiments disclosed herein. For additional details regarding computing devices, refer to FIG. 4.

The devices of FIG. 1.1 may be implemented using logical devices without departing from the embodiments disclosed herein. For example, the devices of FIG. 1.1 may be implemented using virtual machines that utilize computing resources of any number of physical computing devices to provide their respective functionalities. The devices of FIG. 1.1 may be implemented using other types of logical devices without departing from the embodiments disclosed herein.

In one or more embodiments disclosed herein, the network devices are implemented as a switching device such as a switch, multilevel switch, or another type of devices that provides packet switching services. A switching device may be a device that is adapted to facilitate network communications. A switching device may include a computing device and/or other components/devices. Refer to FIG. 4 for additional details regarding a computing device.

While the system of FIG. 1.1 has been illustrated as including a limited number of specific components, a system in accordance with embodiments disclosed herein may include additional, fewer, and/or different components.

To further clarify aspects of network devices, a diagram of network device (10) is provided in FIG. 1.2. Any of the network devices of FIG. 1.1 may be similar to network device (10) illustrated in FIG. 1.2.

FIG. 1.2 shows a diagram of network device (10) in accordance with one or more embodiments described herein. Network device (10) may facilitate network communications. To do so, network device (10) may provide any number of functionalities, including packet forwarding functionality.

To provide packet forwarding functionality, network device (10) may include ingress ports (102), egress ports (104), switching system (106) that switches packets received via ingress ports (102) to egress ports (104), switching system manager (108) that manages the operation of switching system (106), and/or switching system repository (110) maintained by switching system manager (108). Each of these components of network device (10) is discussed below.

Ingress ports (102) may facilitate obtaining of packets from other devices. For example, each ingress port of ingress ports (102) may be adapted to operably connect to other devices. Ingress ports (102) may obtain the packets from the other devices via the operable connections.

Egress ports (104) may facilitate providing of network units to other devices. For example, each egress port of egress ports (104) may be adapted to operably connect to other devices. Egress ports (104) may provide the packets to other devices via the operable connections.

Switching system (106) may forward packets obtained via ingress ports (102) to other devices via egress ports (104). For example, switching system (106) may direct packets received via ingress ports (102) towards egress ports (104). Switching system (106) may selectively direct (e.g., switch) the packets in a manner that facilitates controlling the flow of packets (e.g., packet traffic) across the network illustrated in FIG. 1.1. For additional details regarding switching system (106), refer to FIG. 1.3.

Switching system manager (108) may manage the operation of switching system (106). For example, switching system manager (108) may manage (i) the rate at which packets received via ingress ports (102) are processed, (ii) allocation of storage resources of switching system (106) for buffering of packets, and/or (iii) other aspects of the operation of switching system (106).

To manage the operation of switching system (106), switching system manager (108) may (i) monitor the operation of switching system, (ii) identify a state of the switching system based on the monitoring, and/or (iii) modify the operation of switching system (106) based on the identified state of switching system (106). In one or more embodiments disclosed herein, the state of switching system (106) may reflect, in part, the latency of packets processed by switching system (106) (e.g., a latency state), and/or portions thereof. Switching system manager (108) may modify the operation of switching system (106) based on the latency states of one or more portions of switching system (106) to meet predetermined latency goals. For example, the latency goals may be to limit the latency of packets processed by the portions of switching system (106) to a predetermined amount (e.g., 5 milliseconds or another finite amount of time) or to limit the duration of packet buffering in switching system (106) to a predetermined amount.

In one or more embodiments disclosed herein, switching system manager (108) is implemented using a hardware device including circuitry. Switching system manager (108) may include, for example, a digital signal processor, a field programmable gate array, and/or an application specific integrated circuit. The circuitry of the hardware devices may be adapted to provide the functionality of switching system manager (108). Switching system manager (108) may be implemented using other types of hardware devices without departing from the embodiments disclosed herein.

In one or more embodiments disclosed herein, switching system manager (108) is implemented using computing code stored on a persistent storage that when executed by a processor performs the functionality of switching system manager (108). The processor may be a hardware processor including circuitry such as, for example, a central processing unit or a microcontroller. The processor may be other types of hardware devices for processing digital information without departing from the embodiments disclosed herein.

Switching system manager (108) may perform all, or a portion, of the methods illustrated in FIGS. 2.1-2.2 as part of providing its functionality.

Switching system repository (110) may store information regarding the operation of switching system (106). The stored information may specify the operation of switching system (106) and/or the manner in which switching system manager (108) manages the operation of switching system (106).

For example, switching system repository (110) may store information that specifies (i) operational characteristics of buffers (e.g., queues in which packets are temporarily stored) of switching system (106), (ii) rates at which packets stored in buffers of switching system (106) are processed, and/or (iii) information regarding the states (e.g., latency states) of the buffers of switching systems (106). Switching system manager (108) may maintain and/or utilize the states of the buffers specified by switching system repository (110) when managing the operation of switching system (106).

In one or more embodiments disclosed herein, switching system repository (110) is implemented using devices that provide data storage services (e.g., storing data and providing copies of previously stored data). The devices that provide data storage services may include hardware devices and/or logical devices. For example, switching system repository (110) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

For example, switching system repository (110) may include a memory device (e.g., a dual in line memory device) in which data is stored and from which copies of previously stored data are provided. In another example, switching system repository (110) may include a persistent storage device (e.g., a solid state disk drive) in which data is stored and from which copies of previously stored data is provided. In a still further example, switching system repository (110) may include a memory device (e.g., a dual in line memory device) in which data is stored and from which copies of previously stored data are provided and a persistent storage device that stores a copy of the data stored in the memory device (e.g., to provide a copy of the data in the event that power loss or other issues with the memory device that may impact its ability to maintain the copy of the data cause the memory device to lose the data).

Switching system repository (110) may store data structures including the information discussed above. For additional details regarding data structures that may be stored in switching system repository (110), refer to FIGS. 1.4-1.5.

While network device (10) of FIG. 1.2 has been illustrated as including a limited number of specific components, a system in accordance with embodiments disclosed herein may include additional, fewer, and/or different components.

As discussed above, network device (10) may include switching system (106). FIG. 1.3 shows a diagram of switching system (106) in accordance with one or more embodiments disclosed herein. Switching system (106) may facilitate switching of packets between any number of ingress ports (e.g., 102A, 102L, 102N) and any number of egress ports (e.g., 104A, 104N).

Switching in accordance with one or more embodiments disclosed herein may be a process of directing packets received via an ingress port to one or more egress ports (and to another device via the egress ports). Packets received via an ingress port may be switched towards any number of egress ports. For example, a first packet obtained via a first ingress port may be switched to a first egress port, a second packet obtained via the first ingress port may be switched to a second egress port, a third packet obtained via the first ingress port may be switched to the first egress port, etc. Any packet obtained via the first ingress port may be switched to any of the egress ports.

The packets may be switched based on, for example, the destinations of the packets (e.g., part of control information of the packets). The packets may be switched based on additional and/or different information without departing from embodiments disclosed herein. For example, the packets may be switched based on a network topology, congestion of a network, and/or other factors that impact the flow of packets across a network.

To switch packets, switching system (106) may be operably connected to ingress ports (e.g., 102A, 102L, 102N) and egress ports (e.g., 104A, 104N). Switching system (106) may be operably connected to similar numbers (e.g., 10 ingress ports and 10 egress ports) or different numbers (e.g., 6 ingress ports and 12 egress ports) of ingress and egress ports.

To perform switching, switching system (106) may include any number of traffic processors (e.g., 112A, 112N) and switching fabric (118). Each of these components of switching system (106) is discussed below.

Traffic processors (e.g., 112A) may process packets for switching purposes. Processing packets for switching purposes may include (i) obtaining packets from one or more ports (e.g., 102A, 102L), (ii) selectively dropping any number (e.g., a portion or all) of the packets, and/or (iii) distributing the packets that are not dropped to virtual output queues (116) of the traffic processors that each buffer packets that are to be sent out of a corresponding egress port. In other words, all packets that are to be sent out of a first egress port may be buffered in a first virtual output queue, all packets that are to be sent out of a second egress port may be buffered in a second virtual output queue, etc. Packets may also be switched to the virtual output queues based on other characteristics such as traffic class.

For example, the traffic processor may include a packet processor (114) that selectively drops packets and distributes the packets that are not dropped to the virtual output queues (e.g., 116A, 116N). By doing so, each of the traffic processors (e.g., 112A, 112N) may each include a virtual output queue that stores all packets received by the respective traffic processor that are to be sent out of each corresponding egress port.

To manage traffic, traffic processors (e.g., 112A, 112N) may selectively drop packets based on characteristics of virtual output queues (116) to which the packets will be distributed. For example, when a packet is to be switched from an ingress port to an egress port, the probability that the packet will be dropped before queueing (i.e., placed in a virtual output queue) may depend on (i) the rate packets are being enqueued in the virtual output queues, (ii) an amount of storage resources allocated to the virtual output queues, (iii) a percentage (or other type of quantification) of storage resources allocated to the virtual output queues that are in use, (iv) the rate at which packets are being removed (e.g., dequeued) from the virtual output queues, (v) the latency of packets buffered in the virtual output queues, and/or (vi) latency states of the virtual output queues. Consequently, the selective dropping of packets for each of the virtual output queues (116) may be changed as the operational characteristics (e.g., rate packets are being enqueued to the virtual output queues, storage resources allocated to the virtual output queues, etc.) of the virtual output queues (116) change over time.

The probability that a packet will be dropped by the packet processor before being queued may be stored as part of switching system repository (110, FIG. 1.2). For example, traffic processors (e.g., 112A, 112N) may read (or otherwise use) the aforementioned probability from switching system repository (110, FIG. 1.2) and drop packets as specified by the probabilities. Switching system manager (108, FIG. 1.2) may maintain the aforementioned probabilities in switching system repository (110, FIG. 1.2). The aforementioned probabilities may be stored in other locations without departing from embodiments disclosed herein.

Packet processors (114) may implement any protocol for enqueuing packets to virtual output queues (116) without departing from embodiments disclosed herein. In one or more embodiments disclosed herein, packet processor (114) enqueues packets on virtual output queues mapping to an egress port (and/or at a given traffic class). Virtual output queues are discussed in more details with respect to switching fabric (118), below.

Virtual output queues (116) may temporarily store (e.g., buffer) packets until processed by switching fabric (118). Virtual output queues (116) may be operated as, for example, first in first out queues.

Each virtual output queue of the traffic processors (e.g., 112A, 112N) may temporarily store packets that will be provided to other devices via corresponding egress ports. For example, all packets received by a traffic processor that will be provided to other devices via a first egress port may be stored in a virtual output queue, all packets that will be provided to other devices via a second egress port may be stored in a second virtual output queue, etc. Consequently, each traffic processor may include a virtual output queue for storing packets that will be switched to the same egress port for packet forwarding purposes.

Quantities of storage resources of traffic processor (e.g., 112A) may be dynamically allocated to each virtual output queue of the traffic processor (e.g., 112A) for buffering purposes. The quantity of storage resources may be reallocated between virtual output queues (e.g., 116A, 116N) of a traffic processor (e.g., 112A) to meet packet processing goals (e.g., latency goals), as will be discussed in greater detail below. Traffic processors (e.g., 112A, 112N) may include any quantity of storage resources.

Traffic processors (e.g., 112A, 112N) may be implemented using one or more physical devices. A physical device (e.g., a chip, die, etc.) may include circuitry adapted to perform the functionality of traffic processors (e.g., 112A, 112N). In some embodiments disclosed herein, the circuitry may include programmable portions that may be adapted to execute computing instructions (e.g., computer code) that cause the programmable portions of the circuitry to perform all, or a portion, the functionality of traffic processors (e.g., 112A, 112N).

Virtual output queues (116) may be implemented using any methodology without departing from embodiments disclosed herein. For example, virtual output queues (116) may be implemented as in-memory data structures in which packets are temporarily stored. The packets may be arranged in memory to form queues corresponding to each virtual output queue of virtual output queues (116). Virtual output queues (116) may be implemented using special purpose hardware (e.g., buffers) of traffic processor A (112A).

Virtual output queues (116) may include a virtual output queue corresponding to each egress port to which packets received by traffic processors A (112A) may be switched for forwarding purposes. Any of the other traffic processors (e.g., 112N) may include similar or different numbers of virtual output queues depending on whether they each forward packets to similar or different sets of egress ports (104A, 104N).

Switching system (106) may include any number of traffic processors (e.g., 112A, 112N). Each of the traffic processors may process packets obtained from any number of ingress ports (e.g., a single ingress port, two ingress ports, etc.). Each of the traffic processors may include any number of virtual output queues. Different traffic processors may include similar or different numbers of virtual output queues.

While the traffic processors have been illustrated in FIG. 1.3 as including a limited number of specific components, a traffic processor in accordance with embodiments disclosed herein may include additional, fewer, and/or different components than those illustrated in FIG. 1.3.

Switching fabric (118) may process packets obtained from virtual output queues of traffic processors. Processing packets may include switching packets from virtual output queues of traffic processors to egress ports (e.g., 104A, 104N). In other words, packets may be processed by providing packets to other devices via egress ports.

To switch packets, switching fabric (118) may direct packets from a virtual output queue of a traffic processor to an egress port out of which the packets in the virtual output queue are to be sent. Any number of traffic processors may include a virtual output queue in which packets are enqueued that are to be sent out of the same egress port. In other words, an N to 1 relationship may exist between virtual output queues of the traffic processors and the egress port out of which enqueued packets will be sent. Because the rate at which packets may be sent out of any egress port is limited, the rate at which packets are enqueued in these virtual output queues may exceed that rate at which switching fabric (118) is able to dequeue and send them out of the egress port.

By utilizing virtual output queues, a one to one relationship between a group of virtual output queues and an egress port (e.g., for a given traffic class) may be established (in contrast to a many to one relationship between virtual output queues that buffer packets that will be provided to other devices via a single egress port). The aforementioned relationship may be utilized to efficiently switch packets from traffic processors to egress ports.

To switch packets from virtual output queues to egress ports, switching fabric (118) may process packets from virtual output queues in a predetermined order. Depending on the processing order, the relative weight at which packets are dequeued from each virtual output queue that enqueues packets to be sent out of an egress port may be modified. The processing order of packets may be adjustable.

In one or more embodiments disclosed herein, switching fabric (118) processes packets buffered in virtual output queues based on weights (e.g., processing rates of assigned to each of the virtual output queues of a virtual output queue) assigned to each of the virtual output queues. The switching fabric (118) may process different numbers of packets from each virtual output queue of each traffic processor that buffers packets for the same egress port in a round robin manner based on the weight assigned to each virtual output queue of the virtual output queues associated with (that buffer packets to be sent out of) a given egress port.

For example, consider a scenario in which virtual output queues associated with an egress port include three virtual output queues with weights of 2, 1, and 1, respectively. In such a scenario, the switching fabric may process two packets from the first virtual output queue, one packet from the second virtual output queue, one packet from the third virtual output queue, and then repeat the aforementioned process to process packets of the virtual output queues associated with the egress port.

Switching fabric (118) may perform other methods for switching packets based on weights assigned to each virtual output queue without departing from embodiments disclosed herein. For example, switching fabric (118) may employ time slicing (e.g., processing packets from a first virtual output queue for a predetermined amount of time based on a first weight, processing packets from a second virtual output queue for a second predetermined amount of time based on a second weight, etc.) or other methods of processing packets from different virtual output queues to process packets from all virtual output queues associated with an egress port (and/or traffic class).

The weight assigned to each virtual output queue may be stored as part of switching system repository (110, FIG. 1.2). For example, switching fabric (118) may read weights from switching system repository (110, FIG. 1.2) and process packets as specified by the read weights. Switching system manager (108, FIG. 1.2) may maintain weights stored in switching system repository (110, FIG. 1.2). The aforementioned weights may be stored in other locations without departing from embodiments disclosed herein.

Switching fabric (118) may implement any protocol for distributing packets from virtual output queues (116) to egress ports (e.g., 104A, 104N) without departing from embodiments disclosed herein.

Switching fabric (118) may be implemented using one or more physical devices. A physical device (e.g., a chip, die, etc.) may include circuitry adapted to perform the functionality of switching fabric (118). In some embodiments disclosed herein, the circuitry may include programmable portions that may be adapted to execute computing instructions (e.g., computer code) that cause the programmable portions of the circuitry to perform all, or a portion, the functionality of switching fabric (118).

While switching system (106) of FIG. 1.3 has been illustrated as including a limited number of specific components, a switching system may include additional, fewer, and/or different components without departing from embodiments disclosed herein.

As discussed above, switching system (106) may process packets based on information included in a switching system repository. FIG. 1.4 shows a diagram of switching system repository (110) in accordance with one or more embodiments disclosed herein.

Switching system repository (110) may be implemented as a data structure stored in storage. In one or more embodiments disclosed herein, the storage is implemented using devices that provide data storage services (e.g., storing data and providing copies of previously stored data). The devices that provide data storage services may include hardware devices and/or logical devices. For example, the storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/volatile storage).

For example, the storage may include a memory device (e.g., a dual in line memory device) in which data is stored and from which copies of previously stored data are provided. In another example, the storage may include a persistent storage device (e.g., a solid state disk drive) in which data is stored and from which copies of previously stored data is provided. In a still further example, the storage may include a memory device (e.g., a dual in line memory device) in which data is stored and from which copies of previously stored data is provided and a persistent storage device that stores a copy of the data stored in the memory device (e.g., to provide a copy of the data in the event that power loss or other issues with the memory device that may impact its ability to maintain the copy of the data cause the memory device to lose the data).

Switching system repository (110) may include data structures including switching system operational parameters (132) and switching system states (134). Each of these data structures is discussed below.

Switching system operational parameters (132) may be included in one or more data structures that include parameters that control the manner in which one or more switching systems operate. For example, switching system operational parameters (132) may include any number of parameters that indicate how switching systems are to operate. The switching systems may read or otherwise obtain information based on the information included in switching system operational parameters (132) and process packets in a manner consistent with the obtained information. For additional details regarding switching system operational parameters (132), refer to FIG. 1.5.

Switching system states (134) may be included in one or more data structures that include information regarding the operational states of one or more switching systems. For example, switching system states (134) may include information regarding (i) rates at which packets are being added to virtual output queues of the switching systems, (ii) rates at which packets are able to be provided to other devices via egress ports, (iii) the quantities of storage resources that are and/or may be allocated to each of the virtual output queues of the switching systems, (iv) latency states of the virtual output queues of switching systems, and/or (v) other types and quantities of information regarding the operation of the switching system.

The latency states of virtual output queues may be representations of the time during which packets are buffered in virtual output queues. When a packet is enqueued to a virtual output queue, the packet may be temporarily stored in the virtual output queue until dequeued by a switching fabric. Latency states of the virtual output queues may represent the duration of time that the packets are temporarily stored in the respective virtual output queues.

In one or more embodiments disclosed herein, latency states are discretized. The actual latency of a virtual output queue may be a specific duration of time. To limit the amount of information maintained regarding each virtual output queue, only discretized latency states may be maintained as part of the switching system states (134). For example, each virtual output queue may have a discrete, finite number of latency states (e.g., 10 states).

Each of the latency states may be associated with one or more parameters for operating switching systems. Switching system manager (108, FIG. 1.2) may use the aforementioned parameters to select appropriate parameters with which to operate switching system (106, FIG. 1.2).

Parameters associated with latency states may be selected in any manner without departing from embodiments disclosed herein. For example, an administrator or other person may associate the parameters with the latency states. In other embodiments, statistical analysis of previous operation of the network device may be used to associate the parameters with the latency states. The parameters associated with the latency states may be selected via other methods without departing from embodiments disclosed herein.

Any of the data structures illustrated in FIG. 1.4 may be implemented using structures such as, for example, lists, tables, databases, linked lists, or any other type of structure. Any of the data structures may be implemented using similar or different structures.

While the data structures illustrated in FIG. 1.4 have been described as including a limited amount of specific information, any of the aforementioned data structures may include additional, less, and/or different information without departing from the embodiments disclosed herein. Further, the aforementioned data structures may be combined with other data structures, subdivided into any number of data structures, may be stored in other locations (e.g., in a storage hosted by another device), and/or span across any number devices without departing from the embodiments disclosed herein.

Turning to FIG. 1.5, FIG. 1.5 shows a diagram of switching system operational parameters (132) in accordance with one or more embodiments disclosed herein. As discussed above, switching system operational parameters (132) may be one or more data structures that include information upon which a switching system bases its operation (e.g., ordering of processing packets from virtual output queues, storage resources allocated to each of the virtual output queues, etc.).

Switching system operation parameters (132) may include any number of entries (e.g., 140, 148). Each entry may be associated with a corresponding virtual output queue and include information regarding how the virtual output queue is to be managed by the switching system. For example, each of the entries may include processing rate (142), drop rate (144), and/or storage resources allocation (146).

Processing rate (142) may specify the rate at which packets stored in the associated virtual output queue are to be processed. The rate may be specified as, for example, an absolute or relative value. For example, if specified as a relative value (e.g., relative with respect to the packet processing rates to be afforded to the other virtual output queues of a virtual output queue), the relative value may be expressed as a weight.

The weight may specify, for example, how many packets are to be processed when a round of packets are processed from the virtual output queues associated with an egress port (and/or traffic class). Different virtual output queues associated with an egress port may be assigned different weights resulting in the packets buffered by each of the virtual output queues to be processed at different rates.

Drop rate (144) may include information regarding the rate at which packets, that are to be added to the virtual output queue associated with the entry, are dropped prior to being enqueued. For example, drop rate (144) may be specified as a percentage that specifies the probability that any packet to be added to the virtual output queue associated with the entry will be dropped rather than added to the virtual output queue. Dropped may mean deleting the packet or otherwise not continuing processing of the packet for forwarding purposes (e.g., not adding to a virtual output queue for buffering purposes).

Storage resources allocation (146) may specify a quantity of storage resources that are to be allocated to the virtual output queue associated with the entry. Storage resources allocation (146) may specify, for example, an absolute quantity of resources or a relative quantity of resources (with respect to, for example, the total quantity of resources that may be allocated to all of the virtual output queues of a traffic processor).

The aforementioned information included in each entry may be read or otherwise obtained/used by a switching system. Once obtained, the switching system may operate in a manner consistent with the obtained information.

For example, the switching system may utilize any number of tables, stored in traffic processors (e.g., 112A, FIG. 1.3), to determine how to perform packet switching. The traffic processors may implement one or more algorithms that are used to determine how packets are to be switched when received by a network device. The algorithms used to determine how packets are to be switched may use, in part, the information stored in the tables when making switching decisions. The information stored in the tables may be based, in part, on the entries in the switching system operational parameters (132). Once programmed, the switching system may operate independently and in accordance with its programming until the switching system is reprogrammed.

The switching system may be programmed using the switching system operational parameters (132) in any manner without departing from embodiments disclosed herein. For example, information used to populate the tables of the packet processors may be obtained using, in part, the switching system parameters. The tables may then be populated by writing the information to the tables. The switching system may be programmed using additional, less, and/or different information from that illustrated in FIG. 1.4 without departing from embodiments disclosed herein.

In one or more embodiments disclosed herein, a portion of the switching system (or another entity distinct from the switching system such as an application hosted by a network device), often referred to as the control plane, may program elements of the switching system (often referred to as the data plane) based on any quantity of information (e.g., including, for example, the switching system parameters, information regarding the network topology in which the network device resides, etc.). For example, a switching system may include programmable traffic processors that switch packets to virtual output queues based on their respective programming. Once programmed, the system may perform packet forwarding and switching in accordance with the programming.

While switching system operational parameters (132) are illustrated in FIG. 1.5 in a manner that includes a limited amount of specific information, switching system operational parameters (132) may include addition, less, and/or different information without departing from embodiments disclosed herein. Further, switching system operational parameters (132) may be combined with other data structures, subdivided into any number of data structures, may be stored in other locations (e.g., in a storage hosted by another device), and/or spanned across any number devices without departing from the embodiments disclosed herein.

As discussed above, the switching system may utilize virtual output queues for packet switching purposes. By doing so, relationships between the ingress and egress ports may be established that facilitate forwarding of packets. FIG. 1.6 shows a diagram of relationships that may be present in a switching system in accordance with one or more embodiments disclosed herein.

The relationship diagram of FIG. 1.6 includes illustrations of two relationships. The first relationship is between a port and virtual output queues. Specifically, as seen from the top portion of the diagram, any number of virtual output queues (152, 154) may be associated with an egress port. In other words, any number of packet processors may each include a virtual output queue in which packets to be sent out of egress port (150) are enqueued. Consequently, packets enqueued in each of the associated virtual output queues (152, 154) corresponding to egress port (150) are systematically dequeued and sent out of egress port (150). Consequently, the rates of dequeuing packets from virtual output queues (152, 154) is capped at the rate packets may be sent of out egress port (150).

The second relationship is between virtual output queue (155) and operational parameters (e.g., 132, FIG. 1.4). The operation parameters include ingress rate (156), processing rate (158), and drop rate (160) of the switch system which are associated with the virtual output queue (155). The operational parameters (e.g., 156, 158, 160) may reflect whether (i) virtual output queue (155) is being filled with packets, (ii) virtual output queue (155) is maintaining a same number of packets in virtual output queue (155), and/or (iii) virtual output queue (155) is being emptied of packets. Specifically, the second relationship specifies that ingress rate (156) of packets into virtual output queue (155), processing rate (158) of packets in virtual output queue (155), and drop rate (160) of packets prior to being enqueued in virtual output queue (155) are associated with virtual output queue (155). The aforementioned parameters may determine whether increasing numbers, decreasing number, or stable numbers of packets are in virtual output queue (155). Similar relationships may exist for each virtual output queue of a network device.

As discussed above, switching system (e.g., 106, FIG. 1.2) may switch packets (e.g., direct toward different devices) to facilitate management of packet flow across a network. By switching packets, the packets may be directed toward different network devices in accordance with, for example, a packet traffic management plan. FIGS. 2.1-2.2 show diagrams of methods that may be performed by a network device in accordance with one or more embodiment disclosed herein when managing the flow of packets.

FIG. 2.1 shows a flowchart describing a method for processing packets in accordance with one or more embodiments disclosed herein. The method may be performed by, for example, a switching system manager (e.g., 108, FIG. 1.2) of a network device. Other entities may perform the method of FIG. 2.1 without departing from embodiments disclosed herein.

While the various steps in the flowchart shown in FIG. 2.1 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In Step 200, a change in a state of a virtual output queue of a switching system is identified. The operational parameters associated with the virtual output queue may be monitored to identify the change in the state of the virtual output queue. The operational parameters may include one or more of: (i) a rate of packets being enqueued in the virtual output queue, (ii) a latency of the virtual output queue (e.g., duration of time between when packets and enqueued in and dequeued from a virtual output queue), and (iii) the amount of available storage resources (e.g., for storage of enqueued packets) of the virtual output queue. A change in one or more of the aforementioned operational parameters may indicate a change in the state of the virtual output queue.

For example, consider a scenario in which two virtual output queues of two different traffic processors both enqueue packets to be sent out of the same egress port. Each of the virtual output queues are allocated 50 megabytes of storage for storing (e.g., buffering) packets. Both virtual output queues are currently storing 20 megabytes worth of packets. The switching fabric processes packets from each of the virtual output queues at the same rate. At a point in time, the rate of packets being added to the first virtual output queue increases resulting in the first virtual output queue storing 45 megabytes worth of packets. Based on the aforementioned scenario, monitoring of the operational parameters associated with the first virtual output queue indicates that a change in the state of the first virtual output queue has occurred due to the increased utilization (e.g. 45 megabytes versus 20 megabytes) of the storage resources allocated to the first virtual output queue.

In another example, consider a scenario in which two virtual output queues both enqueue packets to be sent out of the same egress port. Each of the virtual output queues are allocated 50 megabytes of storage for storing (e.g., buffering) packets. Both virtual output queues are currently storing 20 megabytes worth of packets. The switching fabric processes packets from each of the virtual output queues at the same rate. At a point in time, the rate of packets being added to the first virtual output queue increases resulting in the switching fabric preferentially processing packets from the first virtual output queue to ensure that the first virtual output queue does not run out of storage resources for buffering packets. Consequently, the duration of time that packets are buffered in the second virtual output queue greatly increases. Based on the aforementioned scenario, monitoring of the operational parameters associated with the first virtual output queue indicates that a change in the state of the second virtual output queue has occurred due to the increased latency (e.g., buffering time) of packets in the second virtual output queue.

In a still further example, consider a scenario in which two virtual output queues both enqueue packets to be sent out of the same egress port. At a point in time, the rate of packets being added to the first virtual output queue increases. Based on the aforementioned scenario, monitoring of the operational parameters associated with the first virtual output queue indicates that a change in the state of the first virtual output queue has occurred due to the increased rate of packets being added to the first virtual output queue.

The identified change may be a change in multiple dimensions of the state of the virtual output queue. For example, the state of the virtual output queue may reflect multiple operational parameters of the virtual output queue. When, for example, both the amount of used storage resources of the virtual output queue increases and the duration of time packets are buffered in the virtual output queue increases, two dimensions of the state of the virtual output queue have changed.

The change in the state of the virtual output queue of the switching system may be identified based on a latency state of the virtual output queue. For example, a network device may monitor a latency state of each of its virtual output queues as discussed above. A change in the latency of the virtual output queue may indicate a change in the state of the virtual output queue.

In Step 202, an operation of the virtual output queue is modified based on the change in the state of the virtual output queue of the virtual output queue.

In one or more embodiments disclosed herein, the modification includes one or more of: (i) a change in a drop rate of packets prior to enqueuing in the virtual output queue, (ii) a change in a drop rate of packets prior to buffering in a second virtual output queue (e.g., one of multiple virtual output queues that all enqueue packets to be sent out of the same egress port), (iii) a change in a processing rate of packets buffered in the virtual output queue, (iv) a change in a processing rate of packets buffered in the second virtual output queue, (v) a change in an allocation of storage to the virtual output queue, and (vi) a change in an allocation of storage to a second virtual output queue.

In one or more embodiments disclosed herein, the drop rates of the virtual output queue and/or the second virtual output queue are modified based on the latency states of the aforementioned virtual output queues. Latency states may be respective states of the virtual output queues that reflect the duration of time packets are buffered in the virtual output queues. The latency states of virtual output queues may be maintained as part of switching system states (134, FIG. 1.4) (e.g., on a per virtual output queue basis).

The network device may maintain the switching system states by (i) monitoring the latency of packets buffered in each of the virtual output queues, (ii) discretizing the monitored latencies into latency states, and (iii) maintaining the switching system states based on the latency states. By doing so, information regarding the latency states of the virtual output queues may be maintained as part of the switching system states.

To quantize the monitored latency into a latency state, a functional relationship between the latency of a virtual output queue and a latency state may be utilized. For example, the functional relationship may specify the latency state as a function of the transit latency (e.g., time between enqueuing in and dequeueing from a virtual output queue) of the latest packet dequeued from the virtual output queue.

The functional relationship may be a discretized form (e.g., associates ranges of monitored latencies with different latency states) of a linear function, exponential function, or any other type of function. For example, the functional relationship may associate a first latency range with a first latency state, a second latency range with a second latency state, etc.

Each of the latency states may be associated with a corresponding drop probability. The drop probability may increase with increasing latency state until reaching a maximum drop probability up to 100% at a predetermined maximum latency. The maximum latency may be any value. For example, the maximum latency may be an amount of latency above which results in negative impacts on the ability of the network environment in which the network device resides to control the flow of packets within the network environment. The maximum latency may be above or below the aforementioned threshold without departing from embodiments disclosed herein.

Modifying the drop rates of the virtual output queue and/or the second virtual output queue based on the latency states of the respective virtual output queues may regulate the latency of packets buffered in each of the virtual output queues. For example, increasing the drop rate with increasing latency of packets in the virtual output queues may cause the number of packets in a virtual output queue to be maintained below a predetermined number. By virtue of preventing the number of packets in the virtual output queue from exceeding the predetermined number, the corresponding latency of the packets buffered in the virtual output queue may be prevented from exceeding a predetermined duration.

To implement the aforementioned modifications of the drop rates, the drop rate (e.g., 144 of FIG. 1.5) corresponding to each of the aforementioned virtual output queues may be added to corresponding entries of switching system operational parameters (132), as discussed with respect to FIG. 1.5.

In one or more embodiments disclosed herein, the processing rate of the virtual output queue and/or the second virtual output queue are modified based on (i) the rate that packets of the virtual output queue are being processed (e.g., the maximum rate at which the switch fabric and egress port are able to provide packets from the virtual output queue to other devices) and (ii) the rates that packets are being added to each of the virtual output queues associated with a corresponding egress port (e.g., all of the virtual output queues that buffer packets that will be sent out of a particular egress port). For example, the rate at which the packets of the virtual output queues associated with an egress port are being processed may be the maximum rate at which the switching fabric is able to process packets of these virtual output queues (referred to as the virtual output queue processing rate).

The rates at which packets of each of the virtual output queues associated with an egress port are processed may be determined based on the virtual output queue processing rate and the rates that packets are being added to each of the virtual output queues associated with the egress port. In other words, the processing rate of the virtual output queue may be allocated across the virtual output queues associated with the egress port. The processing rate of the virtual output queue may be proportionally allocated to the virtual output queues based on the relative rates at which packets are being added to the virtual output queues associated with the egress port.

For example, consider a scenario in which packets are being processed at 100 gigabits per second from the virtual output queues associated with an egress port, packets are being added at a rate of 150 gigabits per second to a first virtual output queue of the virtual output queues associated with the egress port, and packets are being added at a rate of 50 gigabits per second to a second virtual output queue of the virtual output queues associated with the egress port. In such a scenario, packets from the first virtual output queue are processed at a rate of 75 gigabytes per second (150/

(150+50)×100) and packets from the second virtual output queue are processed at a rate of 25 gigabits per second (50/(150+50)×100) (e.g., a proportional allocation of the rate at which packets can be dequeued from all of the virtual output queues associated with the egress port).

To allocate the virtual output queue processing rate across virtual output queues associated with an egress port, relative weights (e.g., processing rate (142) of FIG. 1.5) corresponding to each of the aforementioned virtual output queues may be added to corresponding entries of switching system operational parameters (132), as discussed with respect to FIG. 1.5. For example, processing weights (e.g., 142) of 0.75 and 0.25 could be added to corresponding entries of switching system operational parameters (132, FIG. 1.5). Consequently, the switching fabric may process packets in an order that causes packets from the first and second queues to be processed at the rates of 75 and 25 gigabits per second, respectively.

Modifying the processing rates of packets of the virtual output queue and/or second virtual output queue may change the manner in which packets that would be queued in the virtual output queue and/or the second virtual output queue are treated by a switching system. It may be more or less likely that the aforementioned packets are dropped prior to being buffered (e.g., prior to being enqueued) in the virtual output queues. Consequently, the latency of each of the virtual output queues associated with an egress port may be maintained by virtue of the changed drop likelihood (e.g., drop rate).

In one or more embodiments disclosed herein, the allocation of storage to the virtual output queue and/or the second virtual output queue are modified based on (i) the rates that packets are being added to each of the virtual output queues of the virtual output queue and (ii) a target latency of packets in the virtual output queues.

When packets are added to a virtual output queue at a rate that is greater than a rate at which the packets are processed (e.g., dequeued), the number of buffered packets may increase. When more packets are buffered in a virtual output queue, the time each packet is buffered may increase. Consequently, the latency of packets buffered in the virtual output queue may increase. Increased latencies may have negative consequences for packet flow control in a network. For example, if the latency of a packet is too large, components of a network may (i) consider the packet to be lost and/or (ii) request that an additional packet that includes information similar to that included in the buffered but considered lost packet be sent. Doing so may result in increased packet transmissions (e.g., network traffic) and/or discarding of the packet by components of a network after being buffered in a virtual output queue.

Embodiments disclosed herein may provide a method for limiting packet latency in virtual output queues by allocating storage to the virtual output queues associated with an egress port based on (i) the rates that packets are being added to the virtual output queues and (ii) the rates at which packets of the virtual output queues are being processed. The storage allocations may be made to ensure that no packets are stored in the virtual output queues beyond the target latency. By doing so, the actual latencies of packets buffered in the virtual output queue may not exceed the target latency.

For example, consider a scenario where packets of a virtual output queue are being processed at a rate of 20 gigabits per second and the virtual output queue has a target latency of 1 millisecond. In this scenario, 2.5 megabytes (20 gigabits per second×1 millisecond) are allocated to the virtual output queue for buffering purposes.

To allocate the storage resources to the virtual output queues, storage resource allocations (e.g., 146 of FIG. 1.5) corresponding to each of the aforementioned virtual output queues associated with an egress port may be added to corresponding entries of switching system operational parameters (132), as discussed with respect to FIG. 1.5.

In one or more embodiments disclosed herein, the drop rates, processing rates, and/or allocations of storage of the virtual output queues associated with an egress port are managed independently. For example, the aforementioned rates and/or allocations may change independently of one another. The changes in rates and/or allocations may be separately modified to prevent the latency of packets buffered in virtual output queues from exceeding predetermined amounts of time. The predetermined amounts of time may be determined based on, for example, packet routing goals of a network in which a network device resides or for other purposes. The predetermined amounts of time may be based on other factors without departing from embodiments disclosed herein.

Modifying the allocations of storage to the virtual output queue and/or second virtual output queue may change the manner in which packets that would be queued in the virtual output queue and/or the second virtual output queue are treated by a switching system. Allocating storage based on the rates packets are being removed from virtual output queues may limit the latencies of the virtual output queues. Allocating storage proportionally to virtual output queues based on the rates at which packets being removed from the virtual output queues may cause the maximum durations of time packets are allowed to be buffered in each of the respective virtual output queues to be matched to each other.

In step 204, a packet associated with the virtual output queue is obtained. The packet may be obtained via, for example, an ingress port. The packet may be provided by another device operably connected to a network device via the ingress port. The packet be addressed to another device (e.g., not the network device that obtained the packet).

In step 206, it is determined whether a drop rate indicates that the packet is to be dropped. The drop rate may be associated with the virtual output queue. The drop rate may be stored as part of switching system operational parameters, as discussed with respect to FIG. 1.5.

The determination may be made based on the probability indicated by the drop rate. The probability may be used in conjunction with, for example, a random number generator or other function to ascertain whether the packet is to be dropped. For example, the probability may specify a range of numbers, that the random number generator may generate, that indicates that the packet is to be dropped. The random number generator may generate a random number. If the random number falls within the range of numbers, the drop rate indicates that the packet is to be dropped. The determination may be made in different manners without departing from embodiments disclosed herein.

In one or more embodiments disclosed herein, the drop rate is specified by a functional relationship. The functionality relationship may specify a probability of dropping the packet as a function of the latency of the queue into which the packet will be enqueued.

The functional relationship may specify that the packet will not be dropped while the queue into which the packet will be enqueued has a latency below a first predetermined latency. In other words, a zero percent chance (e.g., 0% drop probability) of being dropped. The first predetermined latency may be referred to as a minimum latency.

The functional relationship may also specify that the packet will be likely to be dropped prior to being enqueued while the queue into which the packet will be enqueued has a latency above a second predetermined latency. In other words, the packet may have a probability of being dropped prior to be enqueued of a maximum, predetermined rate. The maximum predetermined rate may be 100% or less than 100% (e.g., 90%, 80%, etc.). The second predetermined latency may be referred to as a maximum latency.

The functional relationship may further specify that the packet may be dropped prior to being enqueued while the queue into which the packet will be enqueued has a latency greater than the first predetermined latency but less than the second predetermined latency. The drop rate may be between 0% and the maximum, predetermined rate (e.g., between 0% and 100% if the maximum, predetermined rate is 100%; between 0% and 90% if the maximum, predetermined rate is 90%; etc.) The drop rate may be specified using a continuous or quantized function.

For example, a linear, exponential, or other type of function may be used to specify the probability that a packet will be dropped when the queue into which the packet will be enqueued has a latency between the first predetermined latency and second predetermined latency. The function may specify a 0% drop probability when the queue into which the packet will be enqueued has a minimum latency and a maximum, predetermined value when the queue into which the packet will be enqueued has a maximum latency. If the drop probability is implemented using a linear function, then the drop probability may range continuously between 0% and the maximum, predetermined value over the range of minimum latency to maximum latency.

In some embodiments disclosed herein, the latency of a queue (e.g., a virtual output queue) may be quantized. In other words, the latency of a queue may be categorized based on discrete ranges. Consequently, when the latency of a queue is obtained, it may only take on one of a few, discrete values. The corresponding drop probability may also correspond to only a few, discretized value by virtue of the relationship between the discretized latencies of the queues and the drop probabilities.

By utilizing quantized latency states and corresponding drop rates, the total amount of storage required to store latency states and determine drop rates may be reduced when compared to utilized non-quantized and/or discretized representations. For additional details regarding utilizing quantized latency states and determining corresponding drop rates, refer to FIG. 3.6.

If the drop rate indicates that the packet is to be dropped, the method may proceed to step 208. If the drop rate does not indicate that the packet is to be dropped, the method may proceed to step 210.

In step 208, the packet is discarded. In other words, the packet is dropped and not buffered in the virtual output queue.

The method may end following step 208.

Returning to step 206, the method may proceed to step 210 if the drop rate does not indicate that the packet is to be dropped.

In step 210, the packet is added to the virtual output queue.

The method may end following step 210.

Using the method illustrated in FIG. 2.1, a network device may process packets in a manner that limits the latency of the packets in virtual output queues. By doing so, negative downstream impacts of high latency packets may be avoided. Consequently, routing of packets within a network environment in which the network device resides may be improved.

As noted above, the network device may modify the manner in which packets are processed by a switching system to limit the latency of the packets. To do so, the network device may monitor the operational parameters of the switching system and update the latency state of the switching system.

FIG. 2.2 shows a flowchart describing a method for maintaining latency states in accordance with one or more embodiments disclosed herein. The method may be performed by, for example, a switching system manager (e.g., 108, FIG. 1.2). Other entities may perform the method of FIG. 2.2 without departing from embodiments disclosed herein.

While the various steps in the flowchart shown in FIG. 2.2 are presented and described sequentially, one of ordinary skill in the relevant art, having the benefit of this document, will appreciate that some or all of the steps may be executed in different orders, that some or all of the steps may be combined or omitted, and/or that some or all of the steps may be executed in parallel.

In step 210, a change in latency of packets buffered by a virtual output queue of virtual output queues associated with an egress port (e.g., all of which that enqueue packets to be sent out of the egress port) of a switching system is identified.

The change in latency may be identified by monitoring the latency of packets buffered by the virtual output queue. The latency may be monitored by ascertaining when packets are dequeued from the virtual output queue. The latency may be the difference in time between when the packets are enqueued to and dequeued from the virtual output queue.

The monitoring may be performed by, for example, sampling the latency of packets dequeued from the virtual output queue. The sampling may be performed at one or more points in time.

Sampling the latency of packets may include statistically analyzing the latency of multiple packets dequeued from the virtual output queue. The statistical analysis may include averaging to obtain an average latency associated with a point in time and/or a period of time.

When the latency of the packets dequeued from the virtual output queue changes by a predetermined amount, the change in latency is identified. The predetermined amount may be any amount.

The predetermined amount may correspond to a change in latency range. As discussed above, the latency states of a virtual output queue may correspond to different latency ranges. The predetermined amount may be any amount that causes the latency of the virtual output queue to change latency ranges.

For example, consider a scenario in which a first latency state is associated with a first latency range of less than 0.5 milliseconds and a second latency state is associated with a second latency range of greater than 0.5 milliseconds. If the latency of the virtual output queue is 0.4 milliseconds then the predetermined amount may be an increase of 0.1 milliseconds.

In step 212, a representation of a latency state of the virtual output queue is modified based on the change in latency. A portion of switching system states (e.g., 134, FIG. 1.4) corresponding to the latency of the virtual output queue may be modified to modify the representation of the latency state of the virtual output queue.

The representation of the latency may be, for example, a discretized representation of the latency (i.e., one of a finite number of recognized latency states). The representation of the latency may be modified by using a functional relationship between the actual latency and the discretized latency to identify a current latency state of the virtual output queue. The representation of the latency may be modified to reflect the current latency state of the virtual output queue.

The method may end following step 212.

Using the method illustrated in FIG. 2.2, a network device may maintain the latency state of virtual output queues in a computationally efficient manner. For example, the actual latency of a virtual output queue may be used to ascertain a latency state that may be represented in a computationally efficient manner. By doing so, the computational cost for maintaining the latency state of virtual output queues may be reduced when compared to the computational cost for maintaining the actual latency of the virtual output queue.

In one or more embodiments disclosed herein, a network device is a physical device that includes and/or is operatively connected to persistent storage (not shown), memory (e.g., random access memory (RAM)) (not shown), one or more processor(s) (e.g., integrated circuits) (not shown), and at least one physical network interface (not shown), which may also be referred to as a port. Examples of a network device (e.g., 10, FIG. 1.1) include, but are not limited to, a network switch, a router, a multilayer switch, a fiber channel device, an InfiniBand® device, etc. A network device (e.g., 10, FIG. 1.1) is not limited to the aforementioned specific examples.

In one or more embodiments disclosed herein, a network device (e.g., 10, FIG. 1.1) includes functionality to receive packets (e.g., frames, packets, tunneling protocol frames, etc.) at any of the physical network interfaces (i.e., ports) of the network device (e.g., 10, FIG. 1.1) and to process the packets. In one or more embodiments, processing a packet includes, but is not limited to, a series of one or more table lookups (e.g., longest prefix match (LPM) lookups, forwarding information lookups, etc.) and corresponding actions (e.g., forward from a certain egress port, add a labeling protocol header, rewrite a destination address, encapsulate, etc.). Such a series of lookups and corresponding actions may be referred to as a pipeline, and may, for example, be programmed as a match-action pipeline using the P4 programming language. Examples of pipeline processing include, but are not limited to, performing a lookup to determine: (i) whether to take a security action (e.g., drop the network traffic data unit); (ii) whether to mirror the packet traffic on the network; and/or (iii) determine how to route/forward the packet in order to transmit the packet from an interface of the network device (e.g., 10, FIG. 1.1). Switching system (106, FIG. 2) may perform all, or a portion, of the pipeline processing.

In one or more embodiments disclosed herein, a network device (e.g., 10, FIG. 1.1) also includes and/or is operatively connected to device storage and/or device memory (i.e., non-transitory computer readable mediums used to provide persistent storage resources and/or memory resources) storing software and/or firmware.

Such software and/or firmware may include instructions which, when executed by the one or more processors) of a network device (e.g., 10, FIG. 1.1), cause the one or more processors to perform operations in accordance with one or more embodiments described herein.

The software instructions may be in the form of computer readable program code to perform embodiments described herein, and may be stored, in whole or in part, temporarily or permanently, on a non-transitory computer readable medium such as a CD, DVD, storage device, a diskette, a tape, flash memory, physical memory, or any other non-transitory computer readable medium.

In one or more embodiments, a network device (e.g., 10, FIG. 1.1) is part of a network (e.g., 20, FIG. 1.1). A network may refer to an entire network or any portion thereof (e.g., a logical portion of the devices within a topology of devices). A network may include a datacenter network, a wide area network, a local area network, a wireless network, a cellular phone network, or any other suitable network that facilitates the exchange of information from one part of the network to another. In one or more embodiments, the network may be coupled with or overlap, at least in part, with the Internet.

In one or more embodiments, a network includes a collection of one or more network devices (e.g., network device (e.g., 10, FIG. 1.1)) that facilitate network connectivity for one or more operatively connected devices (e.g., computing devices, data storage devices, other network devices, etc.). In one or more embodiments, a network device (e.g., 10, FIG. 1.1) and other devices (e.g., 5, 30, FIG. 1.1) within a network are arranged in a network topology. In one or more embodiments, a network topology is an arrangement of various elements of a network.

In one or more embodiments, a computing device (e.g., 400, FIG. 4) is any device or any set of devices capable of electronically processing instructions and may include, but is not limited to, any of the following: one or more processors (not shown), memory (e.g., random access memory (RAM)) (not shown), input and output device(s) (not shown), persistent storage (not shown), one or more physical interfaces (e.g., network ports) (not shown), any number of other hardware components (not shown) or any combination thereof. Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer and/or any other mobile computing device), a network device (e.g., switch, router, multi-layer switch, etc.) such as that described above and below, a virtual machine, and/or any other type of computing device with the aforementioned requirements.

To further clarify embodiments disclosed herein, a non-limiting example is provided in FIGS. 3.1-3.6. FIGS. 3.1-3.5 may illustrate a system, or portions thereof, similar to that illustrated in FIG. 1.1 at different points in time. FIG. 3.6 may illustrate a relationship used by the system of FIG. 3.1. For the sake of brevity, only a limited number of components of the system of FIG. 1.1 is illustrated in each of FIGS. 3.1-3.5.

Example

Consider a scenario as illustrated in FIG. 3.1 in which a network device is providing packet forwarding services as part of a network. To provide the forwarding services, the network device includes a switching system that switches packets between ingress and egress ports. The switching system includes three traffic processors (300, 302, 304). In FIGS. 3.1-3.5, packets are illustrated as flowing from left to right in the figures while being processed by the switching system.

To facilitate switching of packets, first traffic processor (300) includes a first virtual output queue (not shown) into which packets are being deposited at a rate of 200 gigabits per second (Gbps). The second traffic processor (302)

includes a second virtual output queue (not shown) into which packets are being deposited at a rate of 55 Gbps. Both of these virtual output queues buffer packets that will be provided to other devices via egress port (310). Egress port (310) is able to provide packets to other devices at a rate of 100 Gbps. Consequently, packets can only be dequeued from these virtual output queues at a rate of 100 Gbps At the point in time illustrated in FIG. 3.1, the switching fabric (not shown) of the switching system is processing packets from the first virtual output queue and the second virtual output queue at 50 Gbps each, which saturates egress port (310). Additionally, while not illustrated in FIG. 3.1, 55 Megabytes of storage are allocated to each of the virtual output queues.

Based on the above description, packets are accumulating in the first virtual output queue of first traffic processor (300) because packets are being enqueued to the first virtual output queue at a rate of 200 Gbps while packets are being dequeued by virtue of processing by the switching fabric at a rate of 50 Gbps. Packets are also accumulating in the second virtual output queue of second traffic processor (302) because packets are being enqueued faster than they are being dequeued.

Based on the change in the number of packets in the first virtual output queue (i.e., the accumulation), the switching system manager (not shown) of the network device identifies that a change in the state of the switching system (more specifically the virtual output queue of first traffic processor (300)) has occurred and modifies the operational parameters of the switching system as shown in FIG. 3.2.

As seen in FIG. 3.2, the switching system manager modified the operational parameters of the switching system to increase the rate at which packets are being processed from the first virtual output queue to 78.4 Gbps and the rate at which packets are being processed from the second virtual output queue to 21.5 Gbps. By doing so, the maximum rate at which packets can be dequeued from the virtual output queues (i.e., 100 Gbps) has been proportionally divided based on the rates at which the packets are being added to the virtual output queues (e.g., 100×(200/(200+55)) and 100×(55/(200+55))).

After modifying the rates at which packets are being processed from the virtual output queues, packets on the first and second virtual output queue experience different latency because the 55 MB of buffer of each virtual output queue is serviced at different rates (e.g., packets are being dequeued at 78.4 and 21.5 Gbps, respectively). For example, packets on the second virtual output queue (e.g., of second traffic processor (302)) are only being dequeued at a rate of 21.5 Gbps while packets are being dequeued at a rate of 78.4 Gbps from the first virtual output queue of first traffic processor (300). Consequently, the duration of time packets are buffered in the second virtual output queue begins to increase substantially until the packets are buffered in the second virtual output queue for much longer than the packets that are buffered in the first virtual output queue.

However, based on the change in the latency of packets in the second virtual output queue, the switching system manager of the network device identifies that a second change in the state of the switching system has occurred and modifies the operational parameters of the switching system as shown in FIG. 3.3.

As seen in FIG. 3.3, the switching system manager modified the operational parameters of the switching system to decrease the amount of storage allocated to the first virtual output queue to 39 Megabytes and the second virtual output queue to 10.8 Megabytes. Consequently, both virtual output queues fill up more quickly than if left at an allocation of 50 Megabytes and begin dropping packets at a higher rate when the latency of the packets being dequeued rises above a 4 ms target, resulting in both virtual output queues only having a latency slightly above 4 milliseconds. In other words, by decreasing the amount of storage allocated to these virtual output queues, packets are dropped prior to being enqueued in both virtual output queues resulting in both virtual output queues being filled but only having around 39 and 10.8 Megabytes worth of data, respectively. Consequently, the processing rates of packets from the virtual output queues (i.e., 78.4 Gbps and 21.5 Gbps) are able to limit the latency of the packets to 4 milliseconds.

By limiting the latency of the packets to 4 milliseconds, negative downstream impacts on the ability of the network to route packets are avoided while also signaling (e.g., indirectly by high packet drop rates by the network device as seen by upstream entities) to upstream entities that the network device is unable to process packets at the rates packets are being directed toward the network device.

Now, consider a second scenario in which the network device is returned to its state as illustrated in FIG. 3.2. As noted above, the network device has modified the rate at which packets are being processed by allocating its ability to process packets from the virtual output queues associated with egress port (310) proportionally based on the rates at which packets are being added to the virtual output queues. Specifically, packets are being processed at a rate of 78.4 Gbps and 21.5 Gbps from the first and second virtual output queues, respectively.

However, because packets are being added to the virtual output queues at a rate greater than packets are being removed from the virtual output queues, the latency of the packets in both virtual output queues is changing. Accordingly, the switch system manager identifies that a state change in the latency state of the virtual output queues has occurred as illustrated in FIG. 3.5. Specifically, the switch system manager identifies that both virtual output queues have entered a high latency state necessitating an increase in the drop rate. In steady state 61% of the packets would be dropped (55 Gbps–21.5 Gbps)/55 Gbps prior to being enqueued To make the determination that a 61% drop rate is necessitated, the switch system manager identifies the drop rate is associated with a high latency state. The functional relationship upon which the determination is based is illustrated in FIG. 3.6. FIG. 3.6 shows a plot of the functional relationship between the actual latency rate, the latency states, and the drop rates corresponding to each of the latency states.

The actual latency rate is plotted along the horizontal axis and the drop rate is plotted along the vertical axis. The functional relationship between the actual latency rate and the latency state is discretized into low, medium, and high latency states. As seen in FIG. 3.6, the discretization breaks what would be an exponential curve into three latency states. The latency states are associated with correspond drop rates of 5%, 30%, and 80%, as indicated by the horizontal bars. In this case, it is expected that the virtual output queue would oscillate between the 30% and 80% drop rates to achieve an effective drop rate of 61%.

In this second scenario, the drop rate for both virtual output queues goes up to 80% because both virtual output queues have entered a high latency state. Consequently, 80% of packets that would be added to both virtual output queues are dropped prior to being enqueued to the virtual output queues. By doing so, the rate that packets are being added to the virtual output queues is reduced by 80% to 15.6 Gbps for the first virtual output queue and 4.3 Gbps for the second virtual output queue. Accordingly, the latency for both virtual output queues begins to decrease resulting in the latency of the virtual output queues having a progressively reduced impact on the network. Once the latency of the virtual output queues is reduced to a medium latency, the drop rate becomes 30% and packets begin to accumulate in the virtual output queues until a high latency state with a drop rate of 80% occurs. In steady state the latency of the virtual output queues may oscillate between medium and high latency states. Consequently, the latency of the packets is bound within a desired range.

End of Example

As discussed above, embodiments disclosed herein may be implemented using computing devices. FIG. 4 shows a diagram of a computing device in accordance with one or more embodiments disclosed herein. Computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, computer processor(s) (402) may be an integrated circuit for processing instructions. For example, computer processor(s) (402) may be one or more cores or micro-cores of a processor. Computing device (400) may also include one or more input devices (410), such as a touchscreen, keyboard, mouse, microphone, touchpad, electronic pen, or any other type of input device. Further, communication interface (412) may include an integrated circuit for connecting computing device (400) to a network (not shown) (e.g., a local area network (LAN), a wide area network (WAN) such as the Internet, mobile network, or any other type of network) and/or to another device, such as another computing device.

In one embodiment disclosed herein, computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (402), non-persistent storage (404), and persistent storage (406). Many different types of computing devices exist, and the aforementioned input and output device(s) may take other forms.

Embodiments disclosed herein may provide a network device and/or method that provide packets switching services that takes into account the latency of packets during switching. For example, embodiments disclosed herein may provide a network device that proactively controls how packets are being switched based on the latency states of virtual output queues used during switching of packets. By doing so, a network device may switch packets within predetermined latency goals. By doing so, downstream impacts of high latency packets may be avoided. Consequently, the computational cost for switching packets may be reduced by avoiding, for example, resending of packets or discarding of packets due to the latency of the packets exceeding latency requirements of the network.

Thus, embodiments disclosed herein may address the problem of dynamically changing network conditions by efficiently marshalling limited network switching resources. For example, embodiments disclosed herein may proactively discard packets prior to buffering (e.g., dropping prior to enqueuing in a virtual output queue) in virtual output queues to limit the latency of packets in virtual output queues. By doing so, consumption of computing resources for buffering of packets that will be discarded downstream due to latency concerns may be avoided.

While embodiments have been described as addressing one or more specific challenges relating to network environments, embodiments disclosed herein are broadly applicable to addressing many networking challenges and the embodiments should not be construed as only addressing or being usable to solve the specific challenges discussed above.

While embodiments described herein have been described with respect to a limited number of embodiments, those skilled in the art, having benefit of this disclosure, will appreciate that other embodiments can be devised which do not depart from the scope of embodiments disclosed herein. Accordingly, the scope embodiments described herein should be limited only by the attached claims.

What is claimed is:

1. A network device, comprising:
a switching system for directing packets between ingress ports and egress ports of the network device; and
a switching system manager programmed to:
make an identification of a state change of a virtual output queue of the switching system; and
perform an action set, in response to the identification of the state change, to oscillate a latency of the virtual output queue between a first predetermined latency and a second predetermined latency lower than the first predetermined latency such that the latency of the virtual output queue is bound within a predetermined range based on a quality of forwarding services to be provided by the network device.

2. The network device of claim 1, wherein the action set comprises:
modifying a drop rate for the virtual output queue based on the change in the state of the virtual output queue.

3. The network device of claim 2, wherein the drop rate is modified by changing a probability of dropping the packets prior to queueing in the virtual output queue.

4. The network device of claim 1, wherein the switching system manager is further programmed to:
prior to identifying the state change:
identify a change in an ingress rate of the virtual output queue;
in response to identifying the change in the ingress rate of the virtual output queue:
perform a second action set, based on the change in the ingress rate of the virtual output queue, to modify the latency of the virtual output queue to meet the predetermined latency.

5. The network device of claim 4, wherein performing the second action set comprises:
modifying a processing rate associated with the virtual output queue, and
modifying a second processing rate associated with a second virtual output queue of the virtual output queue.

6. The network device of claim 5, wherein the processing rate and the second processing rate are modified based on:
- an egress rate of an egress port of the egress ports that is associated with the virtual output queue,
- the change in the ingress rate, and
- an ingress rate of the second virtual output queue.

7. The network device of claim 1, wherein the state change of the virtual output queue is based on a change in latency of the virtual output queue.

8. A method, comprising:
- making an identification of a state change of a virtual output queue of a switching system for directing packets between ingress ports and egress ports of a network device; and
- perform an action set, in response to the identification of the state change, to oscillate a latency of the virtual output queue between a first latency and a second latency lower than the first latency such that the latency of the virtual output queue is bound within a range based on a quality of forwarding services to be provided by the network device.

9. The method of claim 8, wherein the action set comprises:
- modifying a drop rate for the virtual output queue based on the change in the state of the virtual output queue.

10. The method of claim 9, wherein the drop rate is modified to change a probability of dropping the packets prior to queueing in the virtual output queue.

11. The method of claim 8, further comprising:
- prior to identifying the state change:
  - identifying a change in an ingress rate of the virtual output queue;
  - in response to identifying the change in the ingress rate of the virtual output queue:
    - performing a second action set, based on the change in the ingress rate of the virtual output queue, to modify the latency of the virtual output queue to meet the predetermined latency.

12. The method of claim 11, wherein performing the second action set comprises:
- modifying a processing rate associated with the virtual output queue, and
- modifying a second processing rate associated with a second virtual output queue of the virtual output queue.

13. The method of claim 12, wherein the processing rate and the second processing rate are modified based on:
- an egress rate of an egress port of the egress ports that is associated with the virtual output queue,
- the change in the ingress rate, and
- an ingress rate of the second virtual output queue.

14. The method of claim 10, wherein the state change of the virtual output queue is based on a change in latency of the virtual output queue.

15. A non-transitory computer readable medium comprising computer readable program code, which when executed by a computer processor enables the computer processor to perform a method, the method comprising:
- making an identification of a state change of a virtual output queue of a switching system for directing packets between ingress ports and egress ports of a network device; and
- perform an action set, in response to the identification of the state change, to oscillate a latency of the virtual output queue between a first predetermined latency and a second predetermined latency lower than the first predetermined latency such that the latency of the virtual output queue is bound within a predetermined range based on a quality of forwarding services to be provided by the network device.

16. The non-transitory computer readable medium of claim 15, wherein the action set comprises:
- modifying a drop rate for the virtual output queue based on the change in the state of the virtual output queue.

17. The non-transitory computer readable medium of claim 16, wherein the drop rate is modified to adjust a probability of dropping the packets prior to queueing in the virtual output queue.

18. The non-transitory computer readable medium of claim 15, wherein the method further comprises:
- prior to identifying the state change:
  - identifying a change in an ingress rate of the virtual output queue;
  - in response to identifying the change in the ingress rate of the virtual output queue:
    - performing a second action set, based on the change in the ingress rate of the virtual output queue, to modify the latency of the virtual output queue to meet the predetermined latency.

19. The non-transitory computer readable medium of claim 18, wherein the method further comprises:
- wherein performing the second action set comprises:
- modifying a processing rate associated with the virtual output queue, and
- modifying a second processing rate associated with a second virtual output queue of the virtual output queue.

20. The non-transitory computer readable medium of claim 19, wherein the processing rate and the second processing rate are modified based on:
- an egress rate of an egress port of the egress ports that is associated with the virtual output queue,
- the change in the ingress rate, and
- an ingress rate of the second virtual output queue.

* * * * *